(12) United States Patent
Pullen et al.

(10) Patent No.: US 7,019,504 B2
(45) Date of Patent: Mar. 28, 2006

(54) CONSTANT ON-TIME CONTROLLER FOR A BUCK CONVERTER

(75) Inventors: Stuart Pullen, Raleigh, NC (US); Terry J. Groom, Lakeway, TX (US)

(73) Assignee: Arques Technology, Santa Clara, CA (US)

( * ) Notice: Subject to any disclaimer, the term of this patent is extended or adjusted under 35 U.S.C. 154(b) by 350 days.

(21) Appl. No.: 10/614,978

(22) Filed: Jul. 8, 2003

(65) Prior Publication Data

US 2005/0007087 A1   Jan. 13, 2005

(51) Int. Cl.
*G05F 1/56* (2006.01)

(52) U.S. Cl. ...................... 323/283; 323/288
(58) Field of Classification Search ................ 323/282, 323/283, 288
See application file for complete search history.

(56) References Cited

U.S. PATENT DOCUMENTS

| | | | |
|---|---|---|---|
| 6,057,675 A * | 5/2000 | Tateishi | 323/283 |
| 6,246,220 B1 * | 6/2001 | Isham et al. | 323/224 |
| 6,495,995 B1 | 12/2002 | Groom et al. | 323/283 |
| 6,583,610 B1 * | 6/2003 | Groom et al. | 323/288 |
| RE38,487 E * | 4/2004 | Isham et al. | 323/224 |

* cited by examiner

*Primary Examiner*—Jeffrey Sterrett
(74) *Attorney, Agent, or Firm*—Richard F. Frankeny; Winstead Sechrest & Minick P.C.

(57) ABSTRACT

A constant ON-time controller for a buck converter utilizes dual symmetrical ramps. The ramps may be generated artificially or by sensing the voltage across a sense resistor in the output. The ramp may also be generated by sensing the voltage across the "ON" resistance of the low side FET in the switching regulator. A modified output voltage has one of the ramps superimposed and a modified reference voltage has the other ramps superimposed. The modified output voltage and the modified reference voltage are compared to determine when to start the ON-time of the buck converter. The dual ramps reduce, noise susceptibility. The ON-time is stopped in response to charging a capacitor with the regulator input voltage. An offset may also be generated representing the difference between the average output voltage and the reference voltage. The offset is used to generate a modified reference to compensate for the offset.

64 Claims, 10 Drawing Sheets

CONSTANT ON-TIME CONTROLLER FOR A BUCK CONVERTER

TECHNICAL FIELD

The present invention relates in general to controllers for switching regulators and in particular to controllers that set a relatively constant ON-time for the switching devices.

BACKGROUND INFORMATION

Constant ON-time controllers are a class of buck regulators that use the output voltage ripple to initiate an ON-time whenever the output voltage falls below the reference voltage. The ON-time is terminated (generating an ON-time pulse) by circuitry in response to other conditions (e.g., level of regulator input). During the ON-time pulse, energy is supplied directly from the regulator input to the output via an electronic switching device. Likewise, when the ON-time pulse has terminated stored energy from the regulator input is supplied to the output. Most constant ON-time regulators include circuits to adjust the ON-time pulse duration as a function of the input and output voltages, thus resulting in an almost constant frequency as the duty cycle changes. The output voltage ripple is determined to a large extent by the ripple current in the energy storage inductor flowing through the output capacitor's equivalent series resistance (ESR). In applications that require low voltage ripple, the ESR must be very small. This creates two problems for constant ON-time controllers, stability and susceptibility to noise. Some circuits use techniques that supplement the ESR generated ripple with a voltage ramp. These voltage ramps minimize the susceptibility of the controller to noise and thus substantially reduce jitter.

FIG. 1 is a circuit diagram of circuit 100 illustrating a buck regulator and a typical constant ON-time controller. The voltage output (Vout) 116 is set by the duty cycle which is defined as the ratio of ON-time of the high side field effect transistor (FET) 107 to the total switching period. In steady state, Vout 116 is close to the same value as Vref 117. Whenever Vout 116 drops below Vref 117, output 130 of comparator 108 sets latch 109. Gate drivers 100 turn ON FET 107 thereby charging inductor (L) 104 and delivering current to the load (not shown) coupled to the Vout 116. Vout 116 will begin increasing and when it exceeds Vref 117 output 130 of comparator 108 transitions to logic zero and removes the set from latch 109. Latch 109 remains set until the voltage 118 across capacitor (C) 111 exceeds Vref 117. At this time, output 131 of comparator 110 resets latch 109 and gate drivers 100 turn OFF FET 107 and turn ON FET 106. When latch 109 is reset, latch 109 output 133 turns ON FET 112 discharging C 111 thereby causing comparator output 131 to go to logic zero removing the reset to latch 109. One-shot circuit 114 comprising R 113, C 111, FET 112, comparator 110, and latch 109 generates the ON-time for circuit 100. Since at any one value of Vin 115, the ON-time of circuit 100 is dependent only on Vref 117 and the time constant of R 113 and C 112, the ON-time is considered "constant". The energy stored in inductor (L) 104 causes current to continue to flow to a load (not shown) coupled to Vout 116. Catch diode (D) 105 insures that the current in L 104 is not interrupted thus minimizing transients during switching. Resistor R 103 may be used to sense the current to Vout 116.

The time FET 107 is ON (ON-time) is a function of both Vin 115 and Vref 117. As Vin 115 rises, the ON-time will be shorter since C 111 charges faster. If Vref 117 is increased, C 111 has to charge to a higher voltage to trip comparator 110, which also results in a longer ON-time. Thus, the circuitry adjusts the ON-time to minimize the frequency changes (as determined by the time between pulses) that would otherwise result from changes in Vin 115 and Vout 116. To increase the current in L 104 in response to a step change in the load (not shown) coupled to Vout 116, the control loop generates more ON pulses per unit time. To decrease the current in L 104, the control loop generates fewer pulses per unit time. Therefore, during transient load steps the frequency is not constant.

The advantage of constant ON-time controllers is response time. Unlike current mode and voltage mode buck controllers, constant ON-time controllers require no error amplifier and thus their control loop starts responding instantaneously to transient load steps. A buck regulator using a constant ON-time controller has a transient response that is limited only by the energy storage inductor (e.g., L 104) and the input voltage (e.g., Vin 115). These two variables substantially determine how fast the current in L 104 changes in response to a load step. Another advantage of the constant ON-time controller is that the control loop normally does not require any compensation.

The disadvantage of constant ON-time controllers only becomes apparent when the ESR 102 of C 101 becomes very small. ESR 102 is the real part of the complex impedance of C 101. In this situation, the voltage ripple on Vout 116 may be in the range of 15 millivolt (mv) or less and voltage comparator 108 may trip on switching noise coupled into its inputs. When voltage comparator 108 trips on noise, there are resulting variations in the ON-time, which are referred to as "jitter". The jitter is not a sign of instability, but rather it has the effect of generating uncontrolled voltage ripple on Vout 116 and is therefore undesirable.

Stability is the major problem with constant ON-time controllers in applications using low ESR capacitors. L 104 and C 101 make up an LC filter in the output stage that introduces a double "pole" (goes to an infinite value) in the filter transfer function with the poles located at the LC resonance frequency. ESR 102 introduces a "zero" (goes to a zero value) at the frequency were the impedance of C 101 is equal to the value of ESR 102. This zero needs to be introduced into the control loop at a frequency well before the unity gain crossover frequency or the control loop will be unstable. As the ESR/capacitance ratio becomes smaller, the associated zero occurs at a higher frequency. Eventually too much phase shift occurs in the loop response and the control loop becomes unstable. An unstable control loop may over react to a transient load step and cause the current in L 104 to overshoot resulting in excessive ringing. Large output capacitors (e.g., C 101) are generally fabricated by paralleling many smaller capacitors. Individual small ceramic capacitors have a very low ESR/capacitance ratio. If a significant number of these low ESR ceramic capacitors are used (paralleled) to make C 101, the control loop may become unstable. This is particularly true in low power applications where all the capacitors making up C 101 may be ceramic and also in high current applications where many ceramic capacitors are needed to achieve the necessary capacitance for the desired transient response.

Voltage ramps have been used to combat the noise susceptibility problem for constant ON-time controllers. A simple constant ON-time buck converter using a voltage ramp in this manner is shown as circuit 200 in FIG. 2. In this example, the feedback (sensing Vout 216) is taken upstream from Vout 116 (negative input to comparator 208). Circuit 200 has elements similar to circuit 100 in FIG. 1. The explanations concerning circuit elements of circuit 100 that are included in circuit 200 are repeated so that reference will not have to be made back to FIG. 1.

Circuit 200 is a typical constant ON-time controller with some modifications. Vout 216 is set by the duty cycle that is defined as the ratio of ON-time of the high side FET 207 to the total switching period. In steady state, Vout 216 has nearly the same value as Vref 217. Whenever Vout 216 drops below the reference voltage Vref 217, output 230 of comparator 208 sets latch 209 and gate drivers 200 turn ON FET 207 charging L 204 and delivering current to the load (not shown) coupled to the Vout 216. Vout 216 then starts increasing and when it exceeds Vref 217, output 230 of comparator 208 transitions to logic zero and removes the set from latch 209. Latch 209 remains set until the voltage 218 across C 211 exceeds Vref 217. At this time, output 231 of comparator 210 resets latch 209 and gate driver 200 turns OFF FET 207 and turns ON FET 206. When latch 209 is reset, latch output 233 turns ON FET 212 which discharges C 211 causing comparator output 231 to go to logic zero removing the reset to latch 209. One-shot circuit 214 comprising R 213, C 211, FET 212, comparator 210, and latch 209 generates the ON-time for circuit 200. Since at any one value of Vin 215 the ON-time of circuit 200 is dependent only on Vref 217 and the time constant of R 213 and C 212, the ON-time is considered "constant". The energy stored in L 204 causes the current to continue to flow to Vout 216. D 205 insures current in L 204 is not interrupted to minimize transients during switching. Resistor R 203 may be used to sense the current to Vout 216.

The ON-time (time FET 207 is ON) is a function of both Vin 215 and the Vref 217. As Vin 215 rises, the ON-time will be shorter since C 211 charges faster. If Vref 217 is increased, C 211 has to charge to a higher voltage to trip the comparator 210, also resulting in a longer ON-time. Thus, the circuitry adjusts the ON-time to minimize the frequency changes (as determined by the time between pulses) that would otherwise result from changes in Vin 215 and Vout 216. To increase the current in L 204 in response to a step change in the load (not shown) coupled to Vout 216; the control loop generates more ON pulses per unit time. To decrease the current in L 204, the control loop generates fewer pulses per unit time. Therefore, during transient load steps the frequency is not constant. The PCB trace resistance Rtrace 215 increases the effective equivalent series resistance (ESR) seen by the control loop. The effective ESR as seen by the control loop is Rtrace 218 plus ESR 202 while the ESR of capacitor C 201 relative to its ability to smooth the output ripple remains the same. However, taking the feedback upstream adds "droop" to Vout 216 as the drop across Rtrace 218 is a function of load current.

Circuit 300 is another constant ON-time buck regulator where a ramp is introduced in the feedback loop to improve noise rejection. Circuit 300 has elements similar to circuit 100 in FIG. 1. The explanations concerning circuit elements of circuit 100 included in circuit 300 are repeated so that reference will not have to be made back to FIG. 1.

Circuit 300 is a constant ON-time buck converter with some modifications. Vout 316 is set by the duty cycle that is defined as the ratio of ON-time of the high side FET 307 to the total switching period. In steady state, Vout 316 has nearly the same value as Vref 317. Whenever Vout 316 drops below the reference voltage Vref 317, output 330 of comparator 308 sets latch 309 and gate drivers 300 turn ON FET 307 charging L 304 and delivering current to the load (not shown) coupled to the Vout 316. Vout 316 then starts increasing and when it exceeds Vref 317, output 330 transitions to logic zero and removes the set from latch 309. Latch 309 remains set until the voltage 318 across C 311 exceeds Vref 317. At this time, output 331 of comparator 310 resets latch 309 and gate driver 300 turns OFF FET 307 and turns ON FET 306. When latch 309 is reset, latch output 333 turns ON FET 312 which discharges C 311 causing comparator output 331 to go to logic zero removing the reset to latch 309. One-shot circuit 314 comprising R 313, C 311, FET 312, comparator 310, and latch 309 generates the ON-time for circuit 300. Since at any one value of Vin 315 the ON-time of circuit 300 is dependent only on Vref 317 and the time constant of R 313 and C 312, the ON-time is considered "constant". The energy stored in L 304 causes the current to continue to flow to Vout 316. D 305 insures current in L 304 is not interrupted to minimize transients during switching. The energy stored in L 304 causes the current to continue to flow to Vout 316. Catch diode (D) 305 insures current in L 304 is not interrupted to minimize transients during switching.

The ON-time (time FET 307 is ON) is a function of both Vin 315 and the Vref 317. As Vin 315 rises, the ON-time will be shorter since C 311 charges faster. If Vref 317 is increased, C 311 has to charge to a higher voltage to trip the comparator 310, also resulting in a longer ON-time. Thus, the circuitry adjusts the ON-time to minimize the frequency changes (as determined by the time between pulses) that would otherwise result from changes in Vin 315 and Vout 316. To increase the current in L 304 in response to a step change in the load (not shown) coupled to Vout 316; the control loop generates more ON pulses per unit time. To decrease the current in L 304, the control loop generates fewer pulses per unit time. Therefore, during transient load steps the frequency is not constant.

In circuit 300, the voltage across sense resistor R 303 is AC coupled via C 337 and R 318 to sensed Vout 336 to generate the input to comparator 308. Again this increases the ripple as seen by the control loop without increasing the ripple on Vout 316.

Circuit 400 is another constant ON-time buck regulator where a ramp is introduced in the feedback loop to improve noise rejection. Circuit 400 has elements similar to circuit 100 in FIG. 1. The explanations concerning circuit elements of circuit 100 included in circuit 400 are repeated so that reference will not have to be made back to FIG. 1.

Circuit 400 is a typical constant ON-time controller with some modifications. Vout 416 is set by the duty cycle that is defined as the ratio of ON-time of the high side FET 407 to the total switching period. In steady state, Vout 416 has nearly the same value as Vref 417. Whenever Vout 416 drops below the reference voltage Vref 417, output 430 of comparator 408 sets latch 409 and gate drivers 400 turn ON FET 407 charging L 404 and delivering current to the load (not shown) coupled to the Vout 416. Vout 416 then starts increasing and when it exceeds Vref 417, output 430 transitions to logic zero and removes the set from latch 409. Latch 409 remains set until the voltage 418 across C 411 exceeds Vref 417. At this time, output 431 of comparator 410 resets latch 409 and gate driver 400 turns OFF FET 407 and turns ON FET 406. When latch 409 is reset, latch output 433 turns ON FET 412 which discharges C 411 causing comparator output 431 to go to logic zero removing the reset to latch 409. One-shot circuit 414 comprising R 413, C 411, FET 412, comparator 410, and latch 409 generates the ON-time for circuit 400. Since at any one value of Vin 415 the ON-time of circuit 400 is dependent only on Vref 417 and the time constant of R 413 and C 412, the ON-time is considered "constant". The energy stored in L 404 causes the current to continue to flow to Vout 416. D 405 insures current in L 404 is not interrupted to minimize transients during switching. Resistor R 403 may be used to sense the current to Vout 416.

The ON-time (time FET 407 is ON) is a function of both Vin 415 and the Vref 417. As Vin 415 rises, the ON-time will be shorter since C 411 charges faster. If Vref 417 is increased, C 411 has to charge to a higher voltage to trip the comparator 410, also resulting in a longer ON-time. Thus, the circuitry adjusts the ON-time to minimize the frequency changes (as determined by the time between pulses) that would otherwise result from changes in Vin 415 and Vout 416. To increase the current in L 404 in response to a step change in the load (not shown) coupled to Vout 416, the control loop generates more ON pulses per unit time. To decrease the current in L 404, the control loop generates fewer pulses per unit time. Therefore, during transient load steps the frequency is not constant.

Circuit 400 is a more elaborate circuit using a ramp. In circuit 400, a voltage ramp is artificially generated and added directly to the feedback while a slow, precision transconductance amplifier (GMA) 428 corrects for the DC errors introduced by the voltage ramp. A GMA (e.g., GMA 428) produces a current output in response to an input voltage times a gain factor (e.g., Gm). When gate drivers 419 turn ON the low side FET 406, the same signal turns ON FET 421 enabling current source 420 to begin charging C 422. This voltage ramp is impressed across R 424 using operational amplifier (Opamp) 423 and FET 425 thus producing a current ramp (IR) 450. IR 450 is replicated as IRM 451 with current mirror FETs 426 and 427. IR 451 flows in the drain of FET 427 and is used to supplement the output voltage ripple by adding a ripple voltage equal to IR 450 times R 418. IR 450 has a slope determined by the value of current source 420 and the capacitance value of C 422. IR 450 is abruptly terminated when FET 421 turns OFF in response to FET 406 turning OFF, C 422 then discharges through R 452.

A DC correction current, equal to the difference between Vout 416 and Vref 417 times the transconductance Gm, is supplied from the GMA 428. Resistors R 430 and R 431 charge and discharge capacitor C 429 with a current proportional to the difference in Vref 417 and Vout 416. The voltage across C 429 is the integral of this current producing a "filtered" voltage at the inputs to GMA 428 proportional to the difference in Vref 417 and Vout 416. GMA 428 produces an output current (either positive or negative) that slowly compensates for the offset produced by the ramp current IR 451 as long as there is an offset between Vout 416 and Vref 417. The total system offset is set by any inherent offset of GMA 428.

GMA 428 may be implemented as a digital circuit (e.g., comprising an up/down counter, oscillator, and DAC current source; these elements are not shown). The bandwidth of GMA amplifier 428 should be two orders of magnitude below the switching frequency. In a digital implementation of GMA 428, the bandwidth may be adjusted by changing the clock frequency to an up/down counter. This allows for an adaptive bandwidth control. The bandwidth is increased if the difference between Vout 416 and Vref 417 is great. The other desirable feature resulting from implementing GMA 428 as a digital circuit is that its response may be made slow enough that it does not react to transient load steps until the transient step is complete and a new steady state condition is established. While adding an artificially generated ramp has advantages, designing GMA 428 to have the desired bandwidth characteristics and dealing with offsets presents difficulties.

The preceding discussion has shown the improvements and the problems that result from using a compensating ramp in constant ON-time controllers for buck regulators. To overcome the problems, there is a need for circuitry to enable a constant ON-time controller to use real or artificial generated ramps when the ESR of the filter capacitor is low while overcoming the disadvantages of offsets requiring difficult to design offset compensation.

SUMMARY OF THE INVENTION

A constant ON-time controller for a buck switching regulator utilizes dual symmetrical ramps. The ramps may be generated artificially or by sensing the voltage across a sense resistor in the output. The ramp may also be generated by sensing the voltage across the "ON" resistance of the low side FET in the switching regulator. The ramp generated by the sense resistor or the low side FET is called a "real" ramp. A real ramp has information concerning the load current.

A voltage ramp is first replicated generating a first and a second ramp that are substantially equal. The voltage ramps are converted to current ramps with transconductance amplifiers. The output voltage is isolated with a voltage follower and coupled to a series resistor. The reference voltage for the buck regulator is likewise coupled to a series resistor. One of the current ramps is coupled to one side of each of the series resistors. A modified output voltage has one of the ramps superimposed and a modified reference voltage has the other ramp superimposed. The modified output voltage and the modified reference voltage are compared to determine when to start the ON-time of the buck converter. The superimposed ramps reduce the noise susceptibility of the inputs of the comparator while subtracting their offset effect. The ON-time is stopped in response to charging a capacitor with a current proportional to the regulator input voltage.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more, complete understanding of the present invention, and the advantages thereof, reference is now made to the following descriptions taken in conjunction with the accompanying drawings, in which.

DETAILED DESCRIPTION

Figure 1:
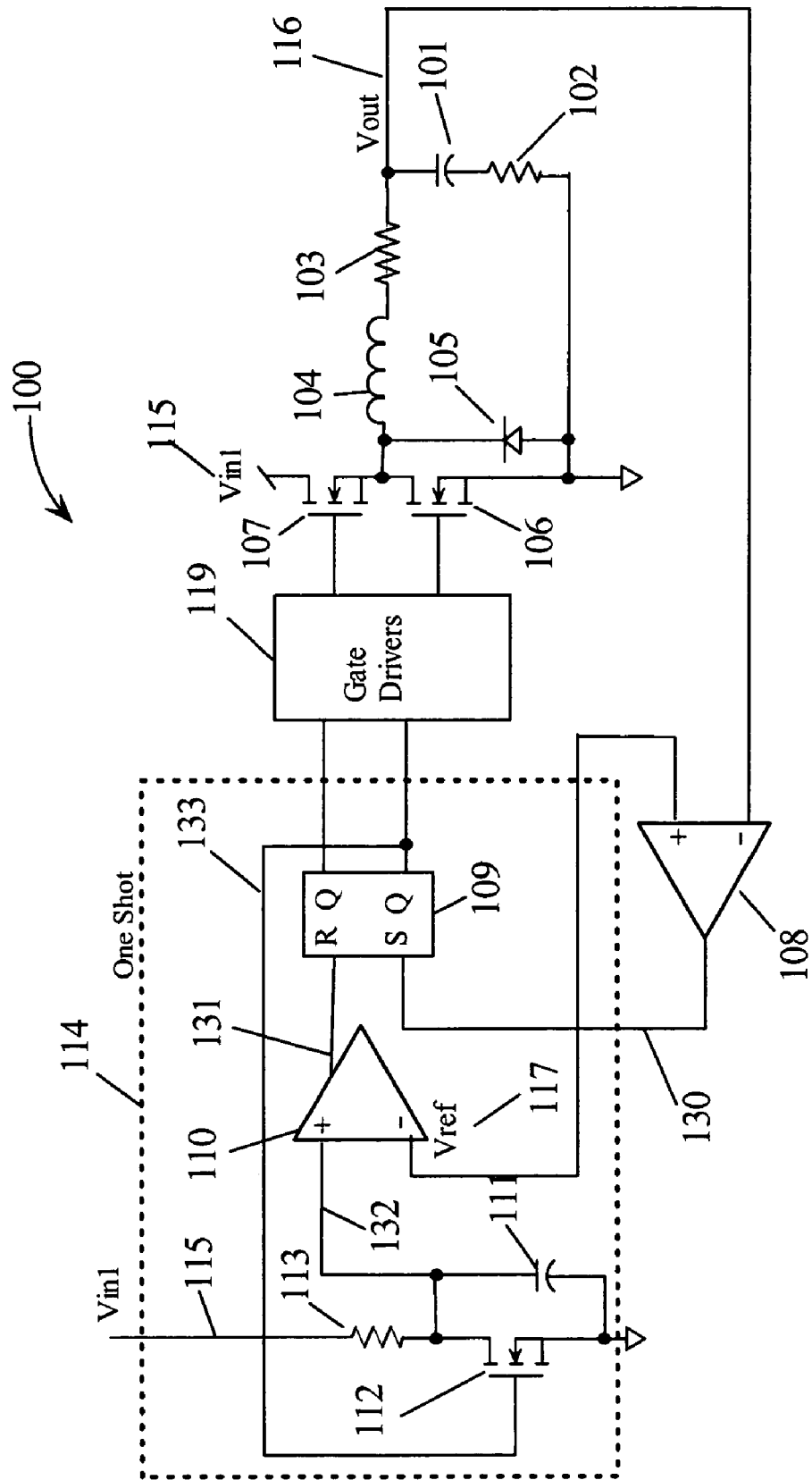
FIG. 1 is a circuit diagram of a typical constant ON-time controller.
Figure 2:
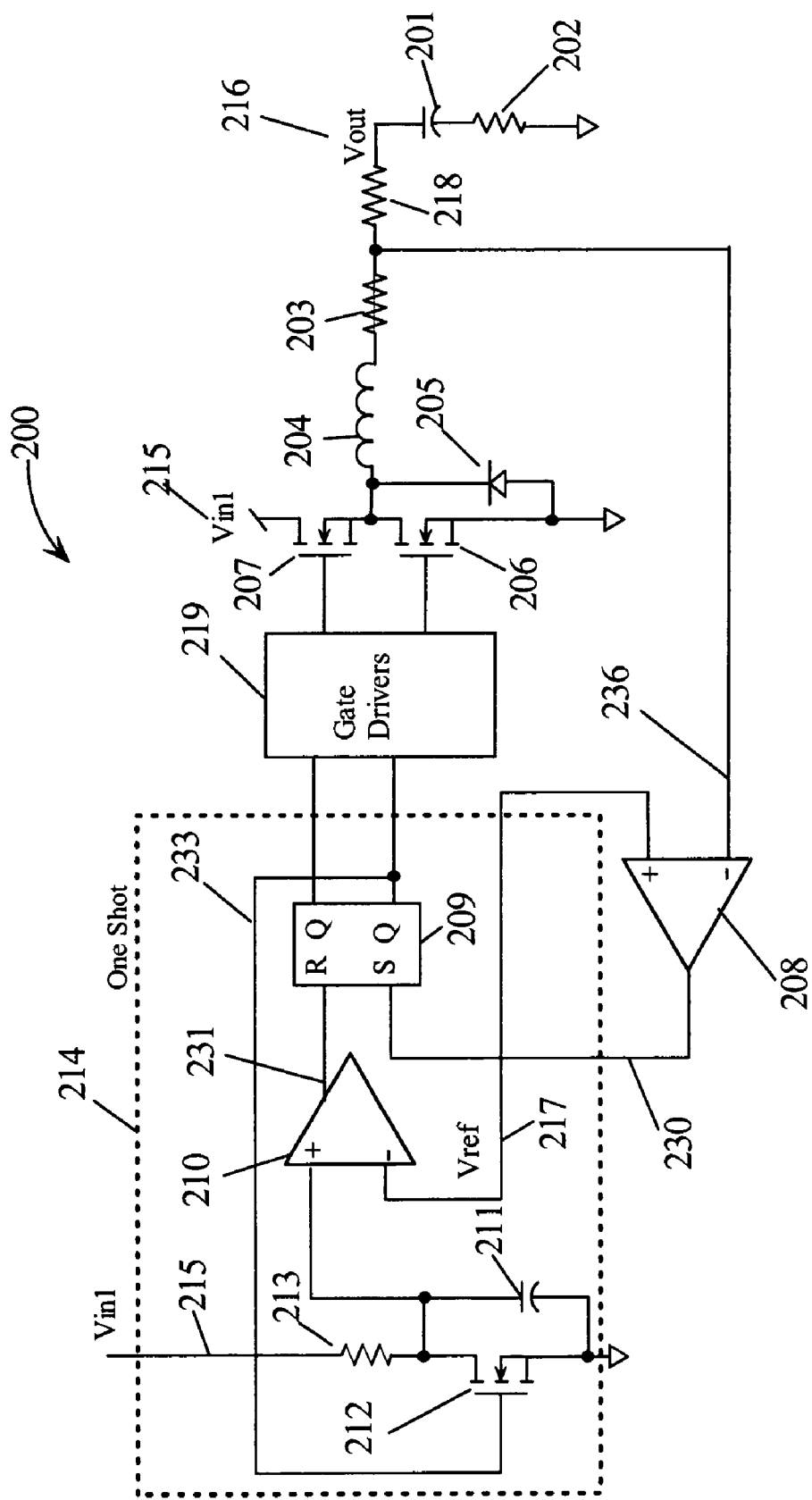
FIG. 2 is a circuit diagram of a constant ON-time controller using a voltage ramp generated by a sense resistor to combat noise susceptibility.
Figure 3:
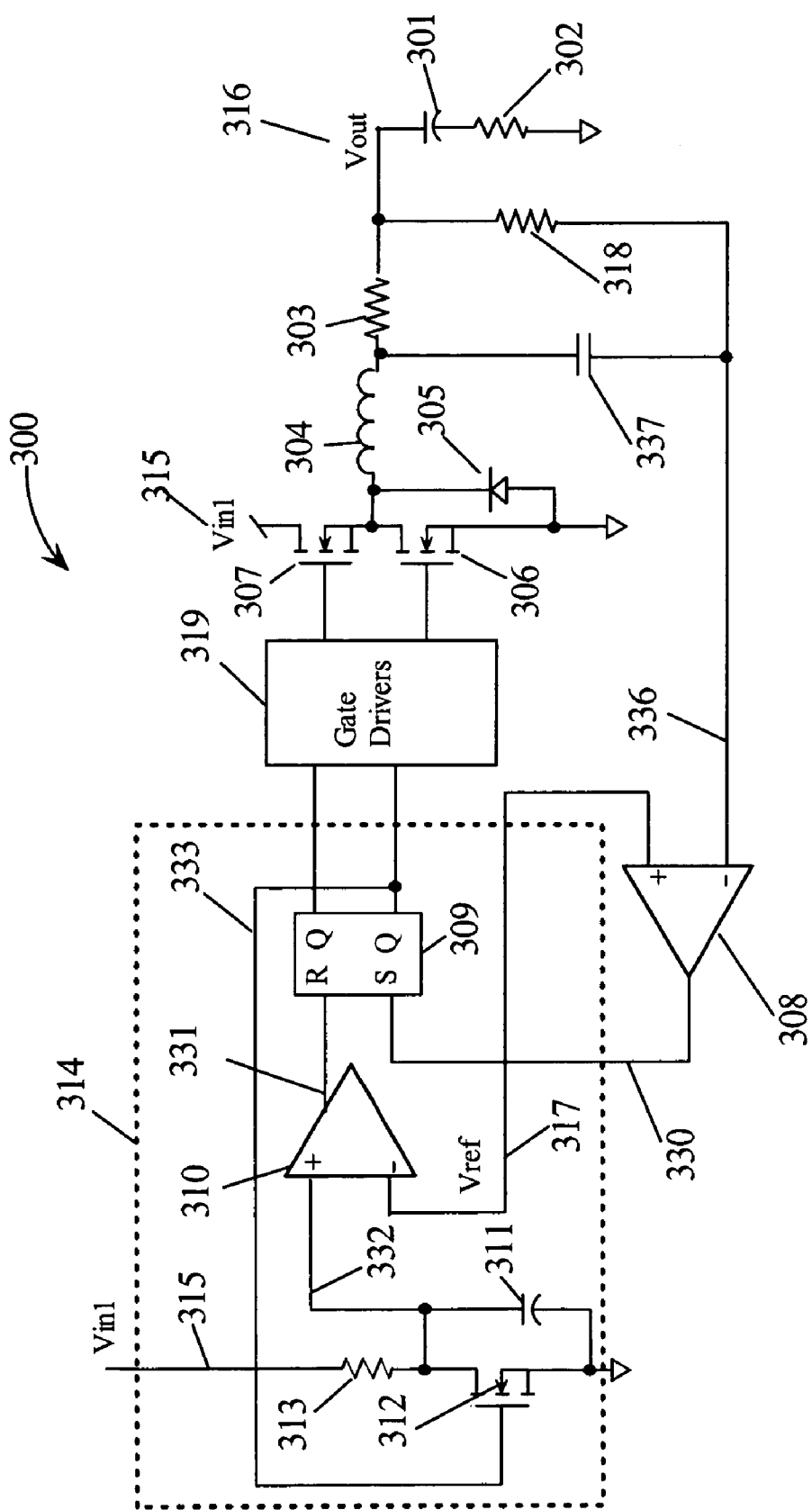
FIG. 3 is a circuit diagram of a constant ON-time controller where the sense resistor output is filtered.
Figure 4:
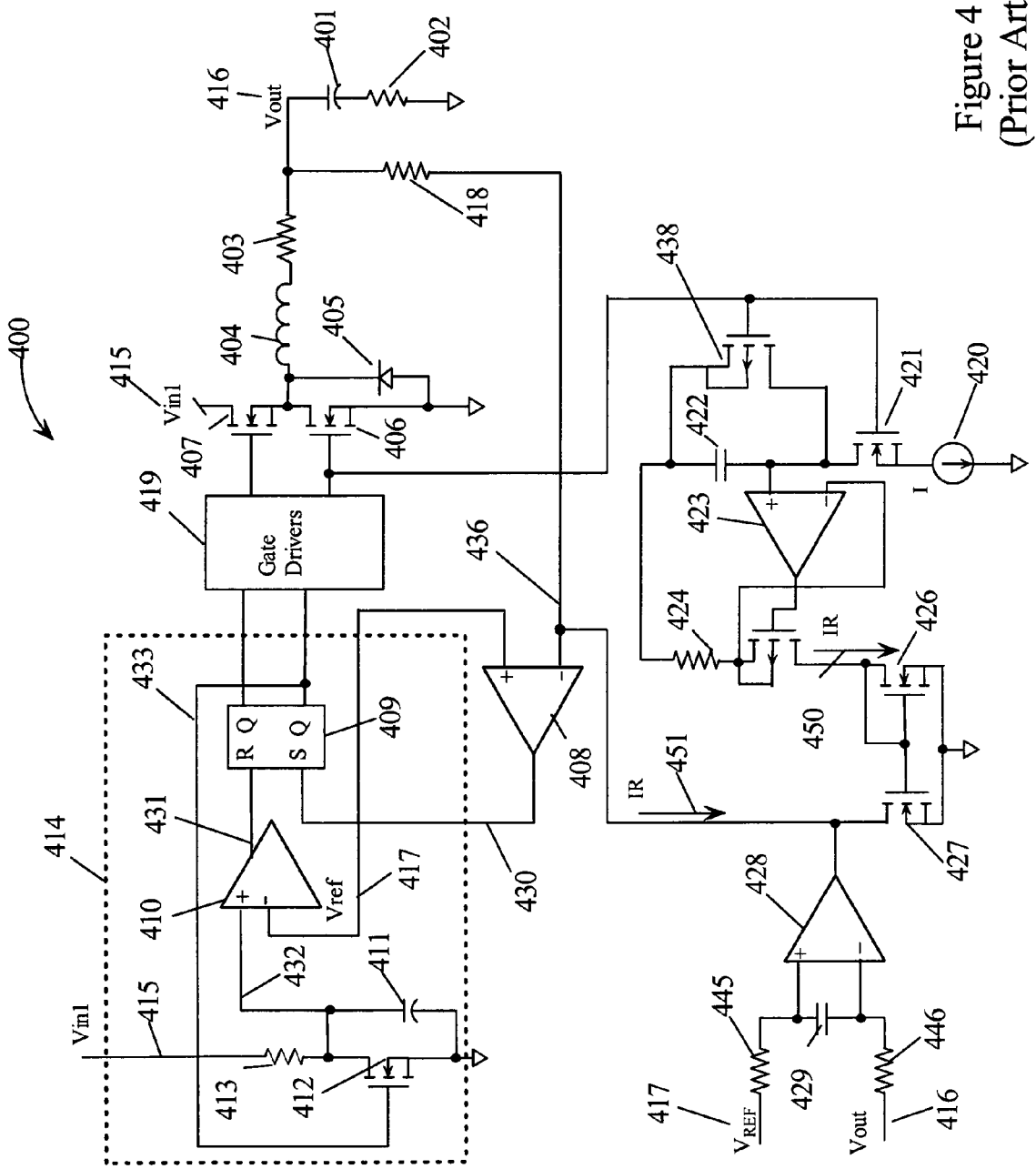
FIG. 4 is a circuit diagram of a constant ON-time controller where the voltage ramp is generated artificially.

In the following description, numerous specific details are set forth to provide a thorough understanding of the present invention. However, it will be obvious to those skilled in the art that the present invention may be practiced without such specific details. In other instances, well-known circuits may be shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following, buck regulator or buck converter may be used interchangeably. Constant ON-time converters referred to in this disclosure only have a constant ON-time when the regulator input and the regulated output are not changing. The ON-time is sometimes referred to as pseudo constant ON-time because of this fact. However, it is understood that in this disclosure the term "constant ON-time converter" is used for simplification to describe a converter that has a pseudo constant ON-time at a fixed frequency.

Figure 5:
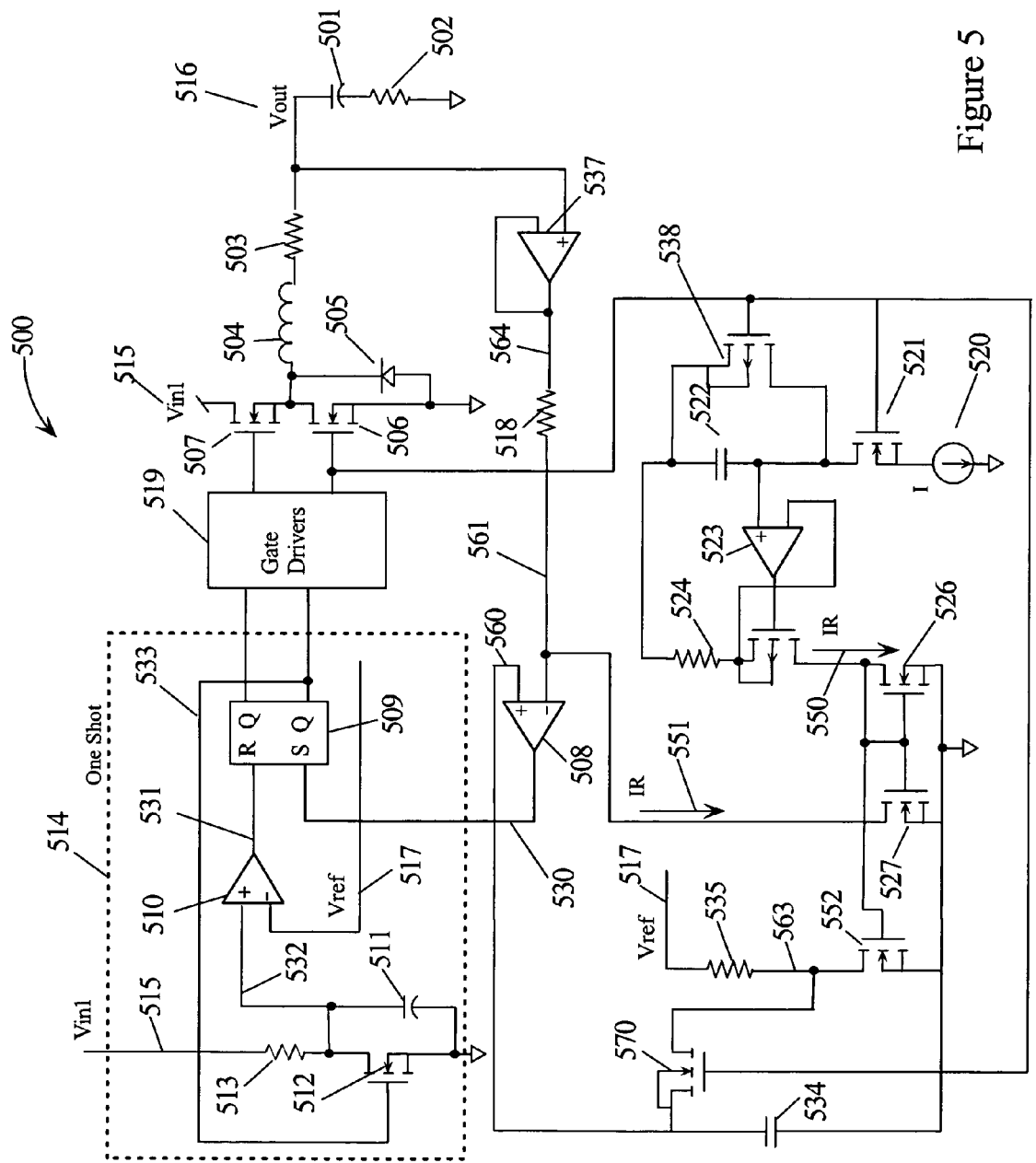
FIG. 5 is a circuit diagram of a constant ON-time controller where the voltage ramp is generated artificially and introduced to both sides of the comparator.

FIG. 5 illustrates circuit 500 according to embodiments of the present invention. Circuit 500 is a constant ON-time controller modified to allow the use of an artificially generated ramp. Circuit 500 has elements similar to circuit 100 in FIG. 1. The explanations concerning circuit elements of circuit 100 that are included in circuit 500 are repeated so that reference will not have to be made back to FIG. 1.

Vout 516 is set by the duty cycle that is defined as the ratio of ON-time of the high side FET 507 to the total switching period. In steady state, Vout 516 has nearly the same value as Vref 517. Whenever Vout 516 drops below the reference voltage Vref 517, output 530 of comparator 508 sets latch 509 and gate drivers 500 turn ON FET 507 charging inductor L 504 and delivering current to the load (not shown) coupled to the Vout 516. Vout 516 then starts increasing and when it exceeds Vref 517, output 530 transitions to logic zero and removes the set from latch 509. Latch 509 remains set until the voltage 518 across C 511 exceeds Vref 517. At this time, output 531 of comparator 510 resets latch 509 and gate driver 500 turns OFF FET 507 and turns ON FET 506. When latch 509 is reset, latch output 533 turns ON FET 512 which discharges C 511 causing comparator output 531 to go to logic zero removing the reset to latch 509. One-shot circuit 514 comprising R 513, C 511, FET 512, comparator 510, and latch 509 generates the ON-time for circuit 500. Since at any one value of Vin 515 the ON-time of circuit 500 is dependent only on Vref 517 and the time constant of R 513 and C 512, the ON-time is considered "constant". The energy stored in L 504 causes the load current to continue to flow to Vout 516 when the charging FET 507 is turned OFF. D 505 insures a current path for the load current in L 504 until FET 506 turns ON and thereby minimizes transients during switching. Resistor R 503 may be used to sense the current to Vout 516.

The ON-time (time FET 507 is ON) is a function of both Vin 515 and the Vref 517. As Vin 515 rises, the ON-time will be shorter since C 511 charges faster. If Vref 517 is increased, C 511 has to charge to a higher voltage to trip the comparator 510, also resulting in a longer ON-time. Thus, the circuitry adjusts the ON-time to minimize the frequency changes (as determined by the time between pulses) that would otherwise result from changes in Vin 515 and Vout 516. To increase the current in L 504 in response to a step change in the load (not shown) coupled to Vout 516, the control loop generates more ON pulses per unit time. To decrease the current in L 504, the control loop generates fewer pulses per unit time. Therefore, during transient load steps the frequency is not constant.

In circuit 500, voltage ramps are introduced to both sides of comparator 508. The reference side 560 is sampled at the valley of its voltage ramp. In circuit 500, the offset created by the voltage ramp introduced in the feedback path is canceled by the sampled ramp added to the reference voltage a 560. No DC correction amplifier is needed. The following is a more detailed explanation of elements of circuit 500.

In circuit 500, a voltage ramp is artificially generated and added directly to the feedback. When the low side FET 506 is gated ON by gate drivers 519, the same signal turns ON FET 521 enabling current source 520 to begin charging C 522. This voltage ramp is impressed across R 524 using Opamp 523 and FET 525 thus producing a current ramp IR 550. IR 550 is replicated as IRM 551 with current mirror FETs 526 and 527. IRM 551 flows in the drain of FET 527 and is used to supplement the output voltage ripple by adding a ripple voltage equal to IR 550 times R 518. IR 550 is also replicated as IR 552 using current mirror FET 533. A voltage ramp is added to Vref 517 by the action of current IR 551 flowing through R 535. Vref 517, with the added voltage ramp, is thus generated at node 563. When FET 570 is gated ON by gate driver signal 562, it samples and "tracks" the voltage on node 563. When FET 570 is gated OFF, it "holds" the sampled voltage from node 563 on capacitor C 534 (node 560).

Unity gain Opamp 537 isolates and buffers Vout 516 generating buffered output VB 564. A substantially identical voltage ramp as generated at node 563 is generated at node 561. At node 561, the voltage ramp is added to VB 564 by the action of current IR 550 from current mirror FET 527 flowing through R 518. If R 536 and R 535 are equal, then the amplitude of the two voltage ramps (at nodes 563 and 561) will be substantially identical. The negative offset created by the (subtractive) voltage ramp on node 560 would create a corresponding positive offset on Vout 516 if not corrected. Vout 516 would have to increase an amount equal to the offset so that VB 564 minus the offset would be at the desired level (Vref 517). However, when FET 506 is turned OFF and the Vout 516 is increasing, FET 570 is turned ON and the substantially same voltage ramp coupled to Vref 517 is sampled and coupled to node 560 of comparator 508 removing the effect of the voltage ramp added at node 561.

Figure 6:
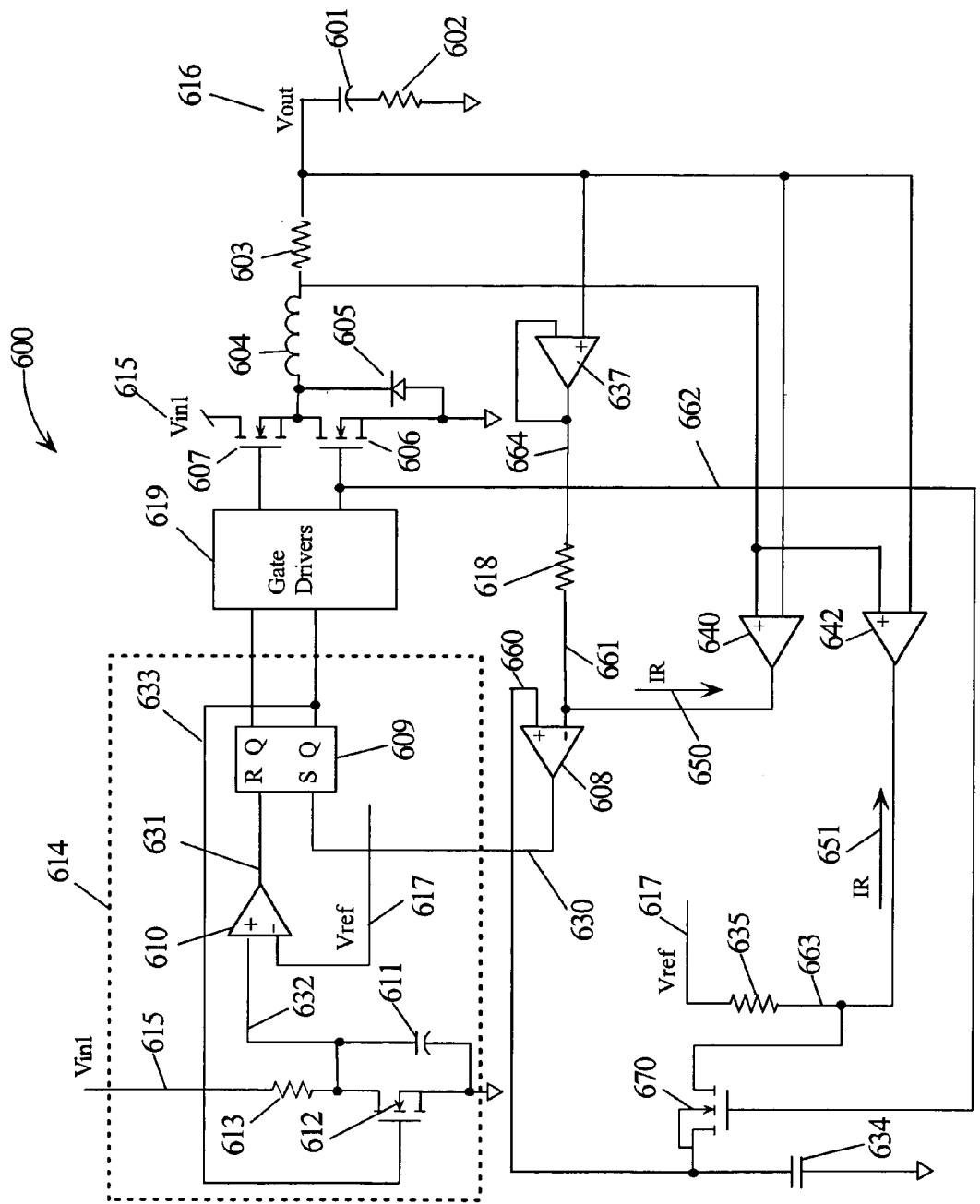
FIG. 6 is a circuit diagram of a constant ON-time controller where the voltage ramp is generated from inductor current and introduced to both sides of the comparator.

FIG. 6 illustrates circuit 600 according to embodiments of the present invention. Circuit 600 is a constant ON-time controller modified to use a "real" voltage ramp resulting from the current from L 604 flowing in sense resistor R 603. Circuit 600 has elements similar to circuit 100 in FIG. 1. The explanations concerning circuit elements of circuit 100 included in circuit 600 are repeated so that reference will not have to be made back to FIG. 1.

Vout 616 is set by the duty cycle that is defined as the ratio of ON-time of the high side FET 607 to the total switching period. In steady state, Vout 616 has nearly the same value as Vref 617. Whenever Vout 616 drops below the reference voltage Vref 617, output 630 of comparator 608 sets latch 609 and gate drivers 600 turn ON FET 607 charging L 604 and delivering current to the load (not shown) coupled to the Vout 616. Vout 616 then starts increasing and when it exceeds Vref 617, output 630 transitions to logic zero and removes the set from latch 609. Latch 609 remains set until the voltage 618 across C 611 exceeds Vref 617. At this time, output 631 of comparator 610 resets latch 609 and gate driver 600 turns OFF FET 607 and turns ON FET 606. When latch 609 is reset, latch output 633 turns ON FET 612 which discharges C 611 causing comparator output 631 to go to logic zero removing the reset to latch 609. One-shot circuit 614 comprising R 613, C 611, FET 612, comparator 610, and latch 609 generates the ON-time for circuit 600. Since at any one value of Vin 615 the ON-time of circuit 600 is dependent only on Vref 617 and the time constant of R 613 and C 612, the ON-time is considered "constant". The energy stored in L 604 causes the current to continue to flow to Vout 616. D 605 insures current in L 604 is not interrupted to minimize transients during switching.

The ON-time (time FET 607 is ON) is a function of both Vin 615 and the Vref 617. As Vin 615 rises, the ON-time will be shorter since C 611 charges faster. If Vref 617 is increased, C 611 has to charge to a higher voltage to trip the comparator 610, also resulting in a longer ON-time. Thus, the circuitry adjusts the ON-time to minimize the frequency changes (as determined by the time between pulses) that would otherwise result from changes in Vin 615 and Vout 616. To increase the current in L 604 in response to a step change in the load (not shown) coupled to Vout 616 the control loop generates more ON pulses per unit time. To decrease the current in L 604, the control loop generates fewer pulses per unit time. Therefore, during transient load steps the frequency is not constant.

When a buck converter is used, Vin 615 is larger than Vout 616. Likewise, at regulation Vout 616 varies only by a small ripple voltage. Since the voltage across L 604 is substantially constant, then the current through L 604 is a natural current ramp. This current flowing through R 603 is natural voltage ramp. Sensing this differential voltage can thus generate a "real" voltage ramp. In circuit 600, GMA 640 and GMA 642 convert the voltage across the sense resistor 603 into two currents, IR 650 and IR 651. GMA 640 and GMA 642 may be combined into a GMA with dual current outputs to improve matching.

A voltage ramp is added to Vref 617 by the action of current IR 651 from GMA 642 flowing through R 635. Vref 617, with the added voltage ramp, is thus generated at node 663. When FET 670 is gated ON by gate driver signal 662, it samples and "tracks" the voltage on node 663. When FET 670 is gated OFF, it "holds" the sampled voltage from node 663 on capacitor C 634 (node 660).

Unity gain Opamp 637 isolates and buffers Vout 616 generating buffered output VB 664. A substantially identical voltage ramp as generated at node 663 is generated at node 661. At node 661, the voltage ramp is added to VB 664 by the action of current IR 550 from GMA 640 flowing through R 618. If R 636 and R 635 are equal, then the amplitude of the two voltage ramps (at nodes 663 and 661) will be substantially identical. The negative offset created by the (subtractive) voltage ramp on node 660 would create a corresponding positive offset on Vout 616 if not corrected. Vout 616 would have to increase an amount equal to the offset so that VB 664 minus the offset would be at the desired level (Vref 617). However, when FET 606 is turned OFF and the Vout 616 is increasing, FET 670 is turned ON and the substantially same voltage ramp coupled to Vref 617 is sampled and coupled to node 660 of comparator 608 removing the effect of the voltage ramp added at node 661.

Figure 7:
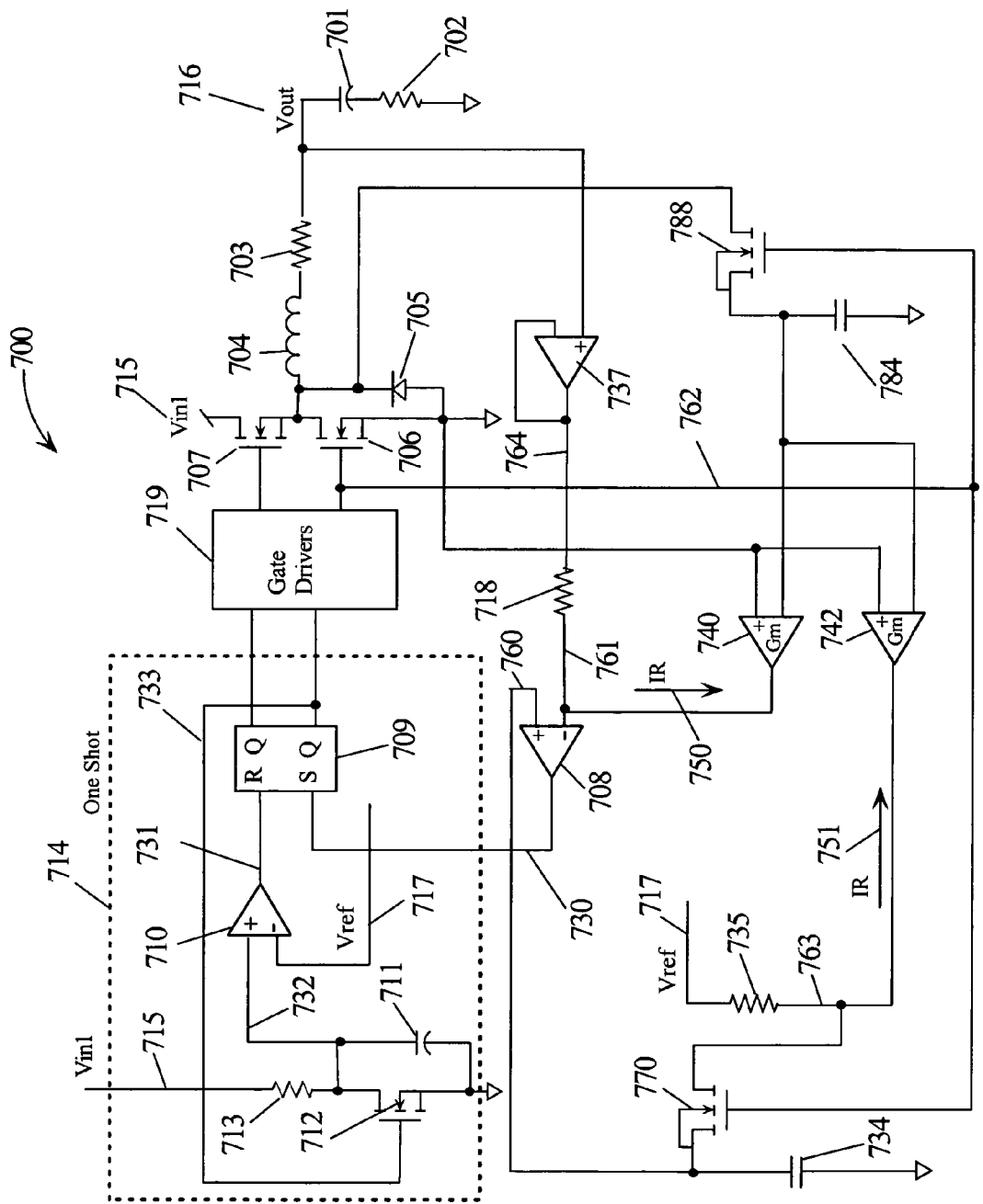
FIG. 7 is a circuit diagram of a constant ON-time controller where the low pass filter is replaced by a sample and hold circuit.

FIG. 7 illustrates circuit 700 according to embodiments of the present invention. Circuit 700 is a constant ON-time controller with additional modifications using a real voltage ramp resulting from the current from L 704 flowing in the ON resistance (RDS) of FET 706. Circuit 700 has elements similar to circuits 100–600 in FIGS. 1–6. The explanations concerning circuit elements of circuit 100–600 included in circuit 700 are repeated so that reference will not have to be made back to other FIGs.

Vout 716 is set by the duty cycle that is defined as the ratio of ON-time of the high side FET 707 to the total switching period. In steady state, Vout 716 has nearly the same value as Vref 717. Whenever Vout 716 drops below the reference voltage Vref 717, output 730 of comparator 708 sets latch 709 and gate drivers 700 turn ON FET 707 charging L 704 and delivering current to the load (not shown) coupled to the Vout 716. Vout 716 then starts increasing and when it exceeds Vref 717, output 730 transitions to logic zero and removes the set from latch 709. Latch 709 remains set until the voltage 718 across C 711 exceeds Vref 717. At this time, output 731 of comparator 710 resets latch 709 and gate driver 700 turns OFF FET 707 and turns ON FET 706. When latch 709 is reset, latch output 733 turns ON FET 712 which discharges C 711 causing comparator output 731 to go to logic zero removing the reset to latch 709. One-shot circuit 714 comprising R 713, C 711, FET 712, comparator 710, and latch 709 generates the ON-time for circuit 700. Since at any one value of Vin 715 the ON-time of circuit 700 is dependent only on Vref 717 and the time constant of R 713 and C 712, the ON-time is considered "constant". The energy stored in L 704 causes the current to continue to flow to Vout 716. D 705 insures current in L 704 is not interrupted to minimize transients during switching. Resistor R 703 may be used to sense the current to Vout 716.

The ON-time (time FET 707 is ON) is a function of both Vin 715 and the Vref 717. As Vin 715 rises, the ON-time will be shorter since C 711 charges faster. If Vref 717 is increased, C 711 has to charge to a higher voltage to trip the comparator 710, also resulting in a longer ON-time. Thus, the circuitry adjusts the ON-time to minimize the frequency changes (as determined by the time between pulses) that would otherwise result from changes in Vin 715 and Vout 716. To increase the current in L 704 in response to a step change in the load (not shown) coupled to Vout 716 the control loop generates more ON pulses per unit time. To decrease the current in L 704, the control loop generates fewer pulses per unit time. Therefore, during transient load steps the frequency is not constant.

When a buck converter is used, Vin 715 is larger than Vout 716. Likewise, at regulation Vout 716 varies only by a small ripple voltage. Since the voltage across L 704 is substantially constant, then the current through L 704 is a natural ramp. This current flowing through the ON resistance (RDS) of FET 706 is thus a natural voltage ramp. Sensing this voltage may thus generate another "real" voltage ramp. In circuit 700, GMA 740 and GMA 742 convert the voltage across RDS of FET 706 into two currents, IR 750 and IR 751. GMA 740 and GMA 742 may be combined into a single GMA with dual current outputs to improve matching. Since the voltage across RDS of FET 706 only represents the current in L 704 when FET 706 is ON, this voltage must be sampled to "track" and then held when the voltage across FET 706 is no longer valid as a ramp (FET 706 is OFF). The voltage across RDS of FET 706 is sampled with the sample and hold circuit comprising FET 788 and C 784. The FET 788 is turned ON when FET 706 turns ON. FET 788 turn OFF when FET,706 turns OFF and C 784 "holds" the last value of the sampled voltage.

A voltage ramp is added to Vref 717 by the action of current IR 751 from GMA 742 flowing through R 735. Vref 717 with the added voltage ramp is thus generated at node 763. When FET 770 is gated ON by gate driver signal 762, it samples and the voltage on node 763. The voltage on node 763 is the last value (valley) of the voltage across RDS of FET 706 prior to FET 706 turning OFF. When FET 770 is gated OFF, it "holds" the sampled voltage from node 763 on capacitor C 734 (node 760).

Unity gain Opamp 737 isolates and buffers Vout 716 generating buffered output VB 764. A substantially identical voltage ramp as generated at node 763 is generated at node 761. At node 761, the voltage ramp is added to VB 764 by the action of current IR 750 from GMA 740 flowing through R 718. If R 736 and R 735 are equal, then the amplitude of the two voltage ramps (at nodes 763 and 761) will be substantially identical. The negative offset created by the (subtractive) voltage ramp on node 760 would create a corresponding positive offset on Vout 716 if not corrected. Vout 716 would have to increase an amount equal to the offset so that VB 764 minus the offset would be at the desired level (Vref 717). However, when FET 706 is turned OFF and the Vout 716 is increasing, FET 770 is turned ON and the substantially same voltage ramp coupled to Vref 717 is sampled and coupled to node 760 of comparator 708 removing the effect of the voltage ramp added at node 761.

The symmetrical ramps used in circuits 500, 600 and 700, whether real or virtual, greatly improve the noise immunity of buck regulators using constant ON-time controllers. These voltage ramps ensure that the reference comparators (e.g., 508, 608 and 708) always has enough signal to be tolerant of switching noise as the actual ripple voltages on the outputs (e.g., 516, 616, and 716) approach zero. However, just using a voltage ramp to improve noise immunity does not address the stability issue that may result when the ESR/capacitor ratio of output capacitors (e.g., C 501, C601 and C 701) become too small.

Figure 8:
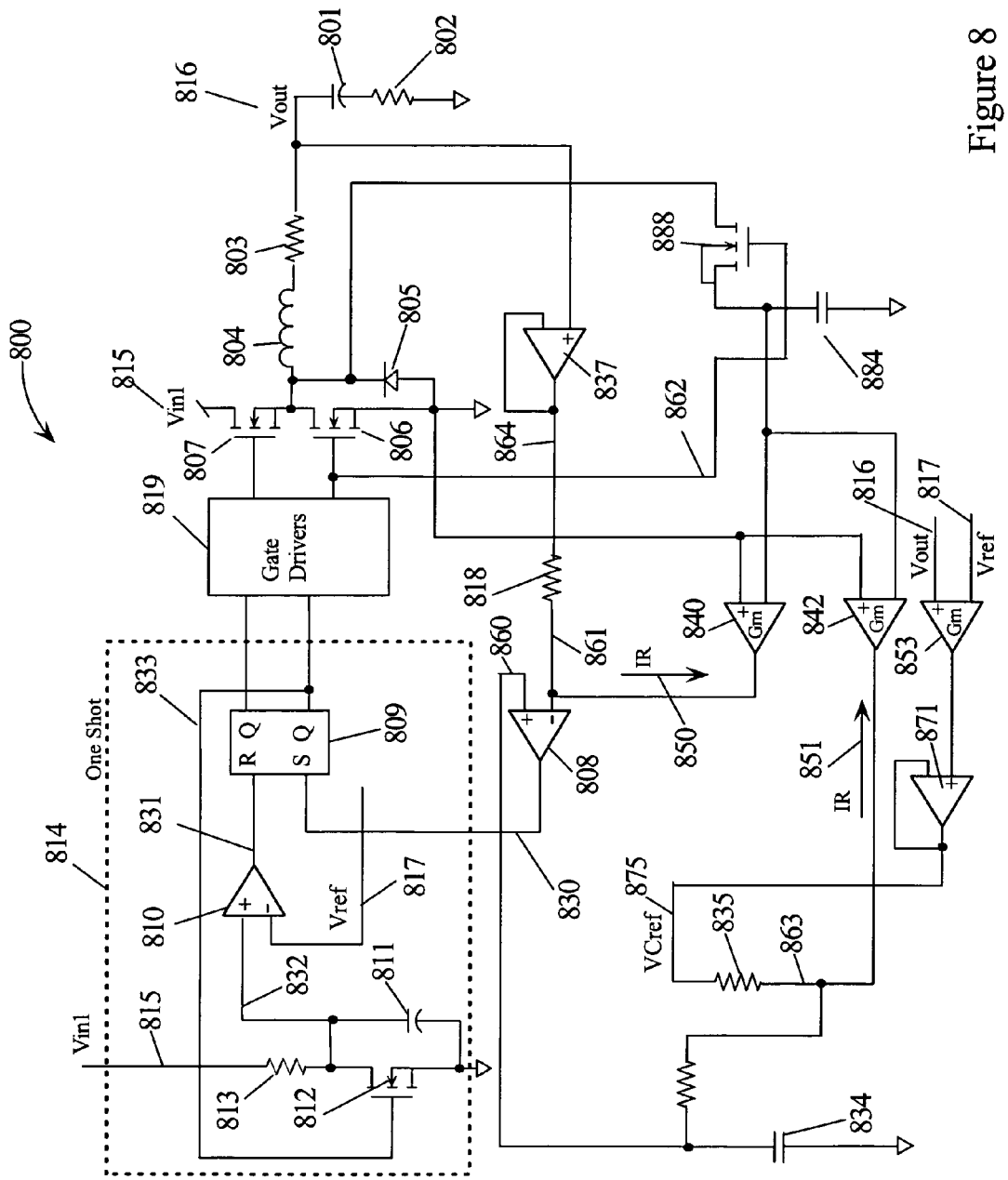
FIG. 8 is a circuit diagram of a constant ON-time controller with a sample and hold circuit and a slow correction amplifier.

FIG. 8 illustrates circuit 800 according to embodiments of the present invention. Circuit 800 is a constant ON-time controller with modifications using a real voltage ramp resulting from the current from L 804 flowing in the on resistance (RDS) of FET 806. Additionally feedback filtering to slow the response time to load steps is added along with a corrected VCref 875 to remove a resulting offset. Circuit 800 may have elements similar to circuit 100–700 in FIG. 1–7. The explanations concerning circuit elements of circuit 100–700 included in circuit 800 are repeated so that reference will not have to be made back to other FIGs.

Vout 816 is set by the duty cycle that is defined as the ratio of ON-time of the high side FET 807 to the total switching period. In steady state, Vout 816 has nearly the same value as Vref 817. Whenever Vout 816 drops below the reference voltage Vref 817, output 830 of comparator 808 sets latch 809 and gate drivers 800 turn ON FET 807 charging L 804 and delivering current to the load (not shown) coupled to the Vout 816. Vout 816 then starts increasing and when it exceeds Vref 817, output 830 transitions to logic zero and removes the set from latch 809. Latch 809 remains set until the voltage 818 across C 811 exceeds Vref 817. At this time, output 831 of comparator 810 resets latch 809 and gate driver 800 turns OFF FET 807 and turns ON FET 806. When latch 809 is reset, latch output 833 turns ON FET 812 which discharges C 811 causing comparator output 831 to go to logic zero removing the reset to latch 809. One-shot circuit 814 comprising R 813, C 811, FET 812, comparator 810, and latch 809 generates the ON-time for circuit 800. Since at any one value of Vin 815 the ON-time of circuit 800 is dependent only on Vref 817 and the time constant of R 813 and C 812, the ON-time is considered "constant". The energy stored in L 804 causes the current to continue to flow to Vout 816. D 805 insures current in L 804 is not interrupted to minimize transients during switching. Resistor R 803 may be used to sense the current to Vout 816.

The ON-time (time FET 807 is ON) is a function of both Vin 815 and the Vref 817. As Vin 815 rises, the ON-time will be shorter since C 811 charges faster. If Vref 817 is increased, C 811 has to charge to a higher voltage to trip the comparator 810, also resulting in a longer ON-time. Thus, the circuitry adjusts the ON-time to minimize the frequency changes (as determined by the time between pulses) that would otherwise result from changes in Vin 815 and Vout 816. To increase the current in L 804 in response to a step change in the load (not shown) coupled to Vout 816 the control loop generates more ON pulses per unit time. To decrease the current in L 804, the control loop generates fewer pulses per unit time. Therefore, during transient load steps the frequency is not constant.

When a buck converter is used, Vin 815 is larger than Vout 816. Likewise, at regulation, Vout 816 varies only by a small ripple voltage. Since the voltage across L 804 is substantially constant, then the current through L 804 is a natural ramp. This current flowing through RDS of FET 806 is thus a natural voltage ramp. Sensing this voltage may thus generate another "real" voltage ramp. In circuit 800, GMA 840 and GMA 842 convert the voltage across RDS of FET 806 into two currents, IR 850 and IR 851. GMA 840 and GMA 842 may be combined into a single GMA with dual current outputs to improve matching. Since the voltage across RDS of FET 806 only represents the current in L 804 when FET 806 is ON, this voltage must be sampled to "track" and then held when the voltage across FET 806 is no longer valid as a ramp (FET 806 is OFF). The voltage across RDS of FET 806 is sampled with the sample and hold circuit comprising FET 888 and C 884. The FET 888 is turned ON when FET 806 turns ON. FET 888 turn OFF when FET 806 turns OFF and C 884 "holds" the last value of the sampled voltage.

Unity gain Opamp 837 isolates and buffers Vout 816 generating buffered output VB 864. A substantially identical voltage ramp as generated at node 863 is generated at node 861. At node 861, the voltage ramp is added to VB 864 by the action of current IR 850 from GMA 840 flowing through R 818. If R 836 and R 835 are equal, then the amplitude of the two voltage ramps (at nodes 863 and 861) will be substantially identical. The negative offset created by the (subtractive) voltage ramp on node 860 would create a corresponding positive offset on Vout 816 if not corrected. Vout 816 would have to increase an amount equal to the offset so that VB 864 minus the offset would be at the desired level (Vref 817).

The voltage at node 863 is filtered by resistor R 870 and C 834 and coupled to node 860. This filtering action limits how fast the inductor current can ramp during a transient load step. This may be very useful when the ESR/capacitance ratio of C 801 is very low as it may prevent overshoot in the inductor current of L 804. However, since the ramps at node 860 and 861 are no longer identical (one is filtered and the other is not) there is a DC offset in the output that needs to be compensated. Since the offset introduced by current ramp IR 850 is only partially cancelled, a slow correction amplifier is needed generate corrected reference voltage VCref 875 to compensate the voltage at node 863 and thus node 860.

To compensate node 863, GMA 872 converts the difference between Vout 816 and Vref 817 to a current that drives capacitor C 874. C 874 integrates this output current to produce VCref 875. The voltage on C 874 is buffered by unity gain Opamp 871 and generates compensated voltage reference VCref 875. A voltage ramp is added to VCref 875 by the action of current IR 851 from GMA 842 flowing through R 835. VCref 875 with the added voltage ramp is thus generated at node 863. VCref 875 is the DC voltage used to determine Vout 216. If the average value of Vout 816 is not equal to Vref 817, the current output of GMA 872 will cause VCref 875 change. If Vout 816 is below Vref 817, then VCref 875 increases and vice versa. VCref 875 remains constant only when Vout 816 is equal to Vref 817. In this manner, VCref 875 compensates for the offset due to the differences in filtered node 860 and non-filtered node 861.

Both of the voltage ramps at nodes 861 and node 863 contain DC and AC signals. The AC signal is due to the inductor ripple current. But in a steady state condition, this AC signal rides on top of the DC signal that is created by the DC load current. When the load current changes, the inductor current must respond. As the inductor current ramps, the unfiltered input (node 861) to the comparator 808 will change as the inductor current changes while the filtered input (node 860) lags behind. As an example, consider a positive load step (load current changes from a low value to a high value). As the inductor current ramps up to a higher value, the voltage at both inputs of the comparator 808 will increase. The filtered input (node 860) lags behind the unfiltered input. The comparator 808 is less likely to initiate an ON-time pulse (set latch 809) because the filter (R 870 and C 834) slows down the voltage increase on node 860. Thus, the filter slows down how fast the control loop can ramp up the current in L 804 in response to a positive load step. The inverse is true during a negative load step. The filter limits how fast the control loop can ramp down the current in L 804. This feature is useful if the output capacitor C 801 is a low ESR ceramic or many low ESR ceramics in parallel with low ESR polymer capacitors. The control loop may be made stable even when the ESR/capacitance ratio of the C 801 is vanishing small.

The operation of circuit 800 may be easier to visualize in the frequency domain. The LC output filter formed by C 801 and L 804 creates a double pole at the LC resonant frequency. If ESR 802 of C 801 does not introduce a zero very near this pole, the system will not be stable. Since the real ramp filter formed by R 870 and C 834 limits how fast the current in L 804 may change, it effectively becomes the new dominant pole for the control loop. The L 804 no longer introduces a pole and the second pole due to C 801 is shifted out in frequency. The new dominant pole rolls off the gain of the control loop at a lower frequency. Splitting the poles allows the circuit 800 to be stabilized even if the zero introduced by ESR 802 occurs after unity gain crossover.

The virtual ramp technique is less susceptible to noise that the real ramp. The voltage ripple across a sensing element (e.g., R 803 or RDS of FET 806) may be less than 20 mv. Since this voltage ripple is closely coupled to the switching elements it may prove difficult to couple this small signal back to the control loop without the introduction of switching noise. Therefore, from a noise perspective a virtual ramp is preferred. Unfortunately, the virtual ramp contains no DC information and as such the virtual ramp may not be used to stabilize ultra low ESR applications. Circuit 900 in FIG. 9 is a combination circuits combining a virtual ramp and DC information.

Figure 9:
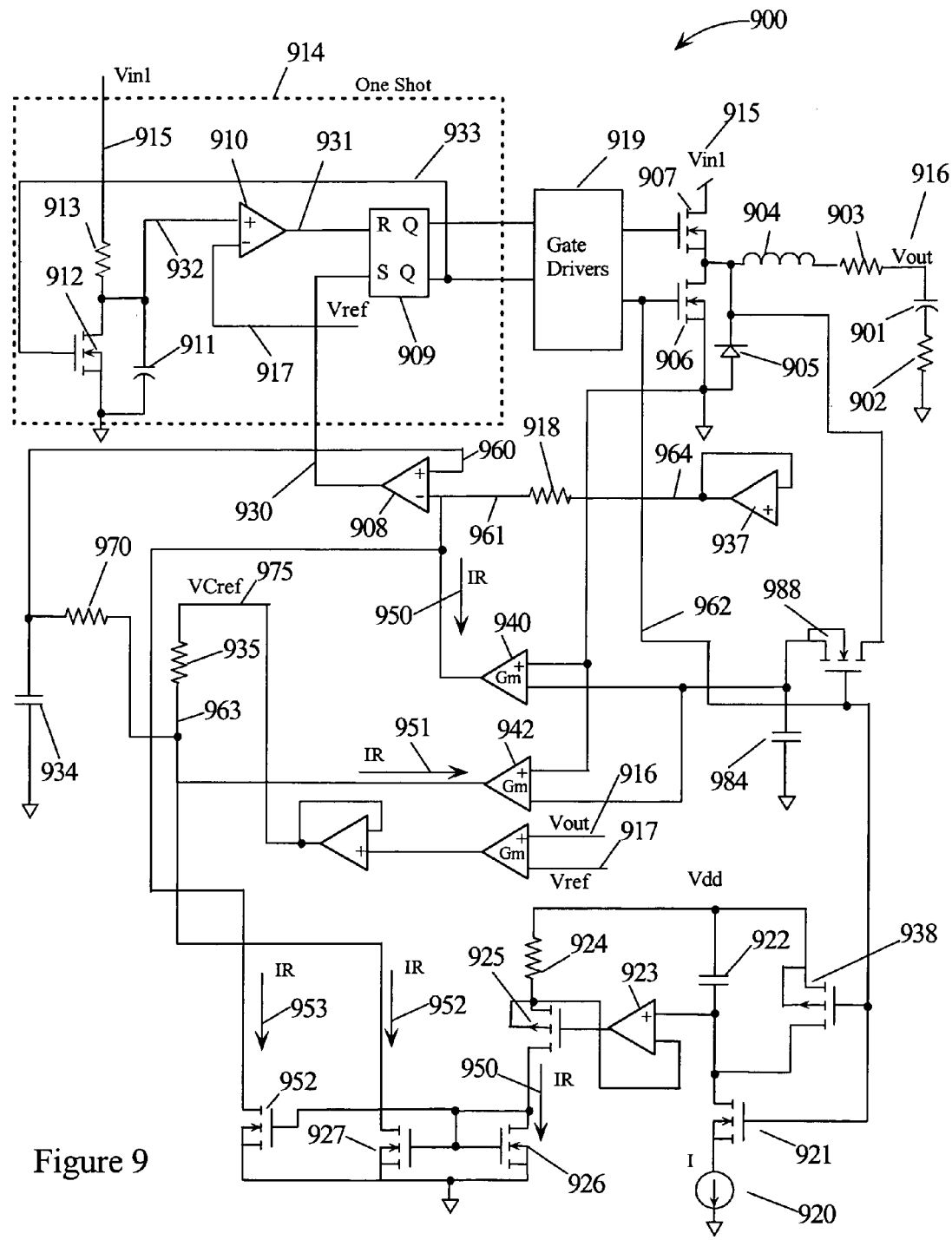
FIG. 9 is a circuit diagram of a constant ON-time controller incorporating all of the features of FIGS. 5, 6, 7, and 8.

FIG. 9 is a circuit diagram of circuit 900 according to embodiments of the present invention. Circuit 900 incorporates into one-circuit features from circuit 500, circuit 700, and circuit 800. The operation of elements from circuits 500, 700 and 800 used in circuit 900 are explained again so that the corresponding FIGs will not have to be referred to in explaining circuit 900.

Vout 916 is set by the duty cycle that is defined as the ratio of ON-time of the high side FET 907 to the total switching period. In steady state, Vout 916 has nearly the same value as Vref 917. Whenever Vout 916 drops below the reference voltage Vref 917, output 930 of comparator 908 sets latch 909 and gate drivers 900 turn ON FET 907 charging L 904 and delivering current to the load (not shown) coupled to the Vout 916. Vout 916 then starts increasing and when it exceeds Vref 917, output 930 transitions to logic zero and removes the set from latch 909. Latch 909 remains set until the voltage 918 across C 911 exceeds Vref 917. At this time, output 931 of comparator 910 resets latch 909 and gate driver 900 turns OFF FET 907 and turns ON FET 906. When latch 909 is reset, latch output 933 turns ON FET 912 which discharges C 911 causing comparator output 931 to go to logic zero removing the reset to latch 909. One-shot circuit 914 comprising R 913, C 911, FET 912, comparator 910, and latch 909 generates the ON-time for circuit 900. Since at any one value of Vin 915 the ON-time of circuit 900 is dependent only on Vref 917 and the time constant of R 913 and C 912, the ON-time is considered "constant". The energy stored in L 904 causes the current to continue to flow to Vout 916. D 905 insures current in L 904 is not interrupted to minimize transients during switching. Resistor R 903 may be used to sense the current to Vout 916.

The ON-time (time FET 907 is ON) is a function of both Vin 915 and the Vref 917. As Vin 915 rises, the ON-time will be shorter since C. 911 charges faster. If Vref 917 is increased, C 911 has to charge to a higher voltage to trip the comparator 910, also resulting in a longer ON-time. Thus, the circuitry adjusts the ON-time to minimize the frequency changes (as determined by the time between pulses) that would otherwise result from changes in Vin 915 and Vout 916. To increase the current in L 904 in response to a step change in the load (not shown) coupled to Vout 916 the control loop generates more ON pulses per unit time. To decrease the current in L 904, the control loop generates fewer pulses per unit time. Therefore, during transient load steps the frequency is not constant.

When a buck converter is used, Vin 915 is larger than Vout 916. Likewise, at regulation Vout 916 varies only by a small ripple voltage. Since the voltage across L 904 is substantially constant, then the current through L 904 is a natural ramp. This current flowing through RDS of FET 906 is thus a natural voltage ramp. Sensing this voltage may thus generate another "real" voltage ramp. In circuit 900, GMA 940 and GMA 942 convert the voltage across RDS of FET 906 into two currents, IR 950 and IR 951. GMA 940 and GMA 942 may be combined into a single GMA with dual current outputs to improve matching. Since the voltage across RDS of FET 906 only represents the current in L 904 when FET 906 is ON, this voltage must be sampled to "track" and then held when the voltage across FET 906 is no longer valid as a ramp (FET 906 is OFF). The voltage across RDS of FET 906 is sampled with the sample and hold circuit comprising FET 988 and C 984. FET 988 is turned ON at the same time that FET 906 turns ON. FET 988 is turned OFF when FET 906 turns OFF and C 984 "holds" the last value of the sampled voltage.

The virtual ramp technique is less susceptible to noise that the real ramp. The voltage ripple across a sensing element (e.g., R 903 or RDS of FET 906) may be less than 20 mv. Since this voltage ripple is closely coupled to the switching elements it may prove difficult to couple this small signal back to the control loop without the introduction of switching noise. Therefore, from a noise perspective a virtual ramp is preferred. Unfortunately, the virtual ramp contains no DC information and as such the virtual ramp may not be used to stabilize ultra low ESR applications. For this reason circuit 900 has circuitry that adds the circuit used in circuit 500 to generate virtual ramps in addition to the real ramps with DC information.

In circuit 900, a virtual voltage ramp is also generated and added directly to the feedback when the low side FET 906 is gated ON by gate drivers 919. The same signal turns ON FET 921 enabling current source 920 to begin charging C 922. This voltage ramp is impressed across R 924 using Opamp 923 and FET 925 thus producing a current ramp IR 950. IR 950 is replicated as IR 953 with current mirror FETs 926 and 933. IR 953 flows in the drain of FET 933 and additionally adds a ripple voltage to node 961 equal to IR 953 times R 918. A virtual voltage ramp is also added to node 963 by the action of current IR 952 of mirror FET 927 flowing through R 935. Node 963 has a virtual ramp generated by IR 952 and real ramp generated by IR 951. The virtual ramp is controlled for noise immunity and the real ramp contains DC information. The filter comprising R 970 and C 934 filters this composite to produce the voltage at node 960. Likewise node 961 has a virtual ramp generated by IR 953 and real ramp generated by IR 950. The virtual ramp is controlled for noise immunity and only partially cancels the offset of virtual ramp generated by IR 952 because of the filter. Real ramp contains DC information and only partially cancels the real ramp generated by the real ramp generated by IR 950 because of the filter.

The voltage at node 963 is filtered by resistor R 970 and C 934 and coupled to node 960. This filtering action limits how fast the inductor current can ramp during a transient load step. This may be very useful when the ESR/capacitance ratio of C 901 is very low as it may prevent overshoot in the inductor current of L 904. However, since the ramps at node 960 and 961 are no longer identical (one is filtered and the other is not) there is a DC offset in the output that needs to be compensated. Since the offset introduced by current ramps are only partially cancelled, a slow correction amplifier is needed generate corrected reference voltage VCref 975 to compensate the voltage at node 963 and thus node 960.

To compensate node 963, GMA 972 converts the difference between Vout 916 and Vref 917 to a current that drives capacitor C 974. C 974 integrates this output current to produce VCref 975. The voltage on C 974 is buffered by unity gain Opamp 971 and generates compensated voltage reference VCref 975. VCref 975 is the DC voltage used to determine Vout 216. If the average value of Vout 916 is not equal to Vref 917, the current output of GMA 972 will cause VCref 975 change. If Vout 916 is below Vref 917, then VCref 975 increases and vice versa. VCref 975 remains constant only when Vout 916 is equal to Vref 917. In this manner, VCref 975 compensates for the offset due to the differences in filtered node 960 and non-filtered node 961.

The voltage ramps at nodes 961 and node 963 contain DC and AC signals. The AC signal is due to the added voltage ramps. But in a steady state condition, this AC signal rides on top of the DC signal that is created by the DC load current. When the load current changes, the inductor current must respond. As the inductor current ramps, the unfiltered input (node 961) to the comparator 908 will change as the inductor current changes while the filtered input (node 960) lags behind. As an example, consider a positive load step (load current changes from a low value to a high value). As the inductor current ramps up to a higher value, the voltage at both inputs of the comparator 908 will increase. The filtered input (node 960) lags behind the unfiltered input. The comparator 908 is less likely to initiate an ON-time pulse (set latch 909) because the filter (R 970 and C 934) slows down the voltage increase on node 960. Thus, the filter slows down how fast the control loop can ramp up the current in L 904 in response to a positive load step. The inverse is true during a negative load step. The filter limits how fast the control loop can ramp down the current in L 904. This feature is useful if the output capacitor C 901 is a low ESR ceramic or many low ESR ceramics in parallel with low ESR polymer capacitors. The control loop may be made stable even when the ESR/capacitance ratio of the. C 901 is vanishing small.

The operation of circuit 900 may be easier to visualize in the frequency domain. The LC output filter formed by C 901 and L 904 creates a double pole at the LC resonant frequency. If ESR 902 of C 901 does not introduce a zero very near this pole, the system will not be stable. Since the filtering of the real ramp portion of the voltage on node 963 by R 970 and C 934 limits how fast the current in L 904 may change, it effectively becomes the new dominant pole for the control loop. The L 904 no longer introduces a pole and the second pole due to C 901 is shifted out in frequency. The new dominant pole rolls off the gain of the control loop at a lower frequency. Splitting the poles allows the circuit 900 to be stabilized even if the zero introduced by ESR 902 occurs after unity gain crossover. The virtual ramps serve mainly to reduce noise sensitivity and are not affected by load current.

Figure 10:
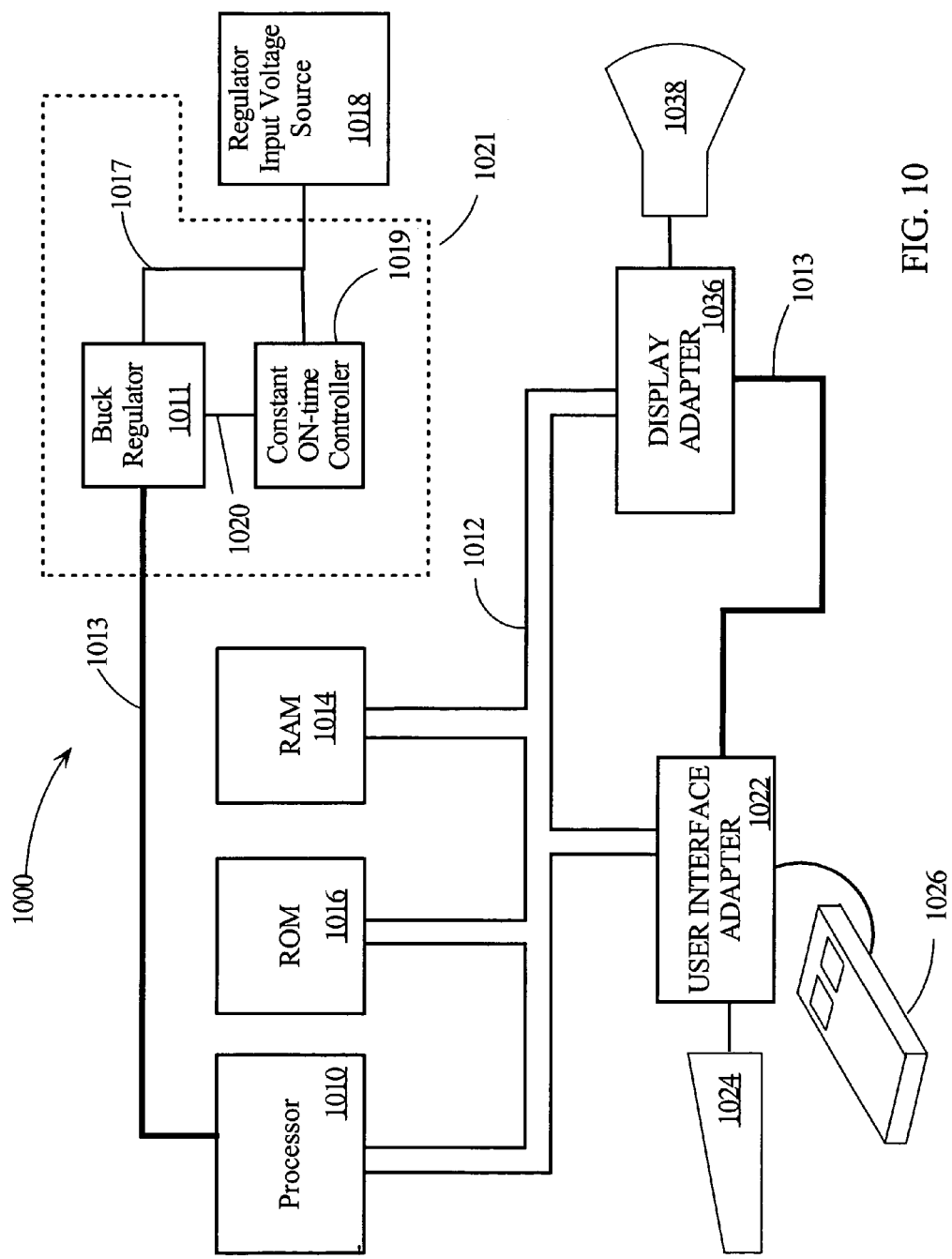
FIG. 10 is a representative hardware environment for practicing the present invention.

A representative hardware environment for practicing the present invention is depicted in FIG. 10, which illustrates a typical hardware configuration of a system in accordance with the subject invention having processing unit (processor) 1010 and a number of other units interconnected via system bus 1012. The system shown in FIG. 10 includes random access memory (RAM) 1014, read only memory (ROM) 1016, user interface adapter 1022 for connecting keyboard 1024 and mouse 1026 and/or other user interface devices such as a touch screen device (not shown) to bus 1012, and display adapter 1036 for connecting bus 1012 to display device 1038. A power supply system 1021 comprising buck regulator 1011 and constant ON-time controller 1019 receive regulator input voltage 1017. Controller 1019 generates a control signal 1020 according to embodiments of the present invention. Control signal 1020 sets the ON-time for buck regulator 1011 for generating a regulated voltage on power bus 1013 which delivers power to a system component (e.g., processor 1010, memory 1016 and 1014, display adapter 1036 and interface adapter 1022. Regulator input voltage source 1018 may be an alternating current source (AC) adapter, a battery or another regulator with a higher output voltage that provided on power bus 1012. Typically the system components have requirements for different power supply voltage levels. For example, processor 1010 may require a much lower power supply voltage than the display adapter 1036. To meet these varying voltage level needs, multiple power supply systems (similar, to 1021) may be used to power various components in system 1000.

Although the present invention and its advantages have been described in detail, it should be understood that various changes, substitutions and alterations can be made herein without departing from the spirit and scope of the invention as defined by the appended claims.

What is claimed is:

1. A controller for generating an ON-time for a buck regulator receiving a regulator input voltage and generating a regulated output voltage, said controller comprising:
    circuitry for sensing said regulated output voltage and generating a sensed output voltage proportional to said regulated output voltage;
    circuitry for adding a first voltage ramp to said sensed output voltage to generate a modified sensed output voltage;
    circuitry for adding a second voltage ramp to a first reference voltage to generate a ripple reference voltage;
    circuitry for processing said ripple reference voltage to generate a modified reference voltage;
    circuitry for comparing said modified sensed output voltage to said modified reference voltage generating a comparator output having a first logic state when said modified sensed output voltage is greater than said modified reference voltage and a second logic state when said modified sensed output voltage is less than said modified reference voltage; and
    circuitry for generating a control signal having a first logic state during said ON-time in response to said comparator output, said regulator input voltage and a second reference voltage, wherein said regulated output voltage receives energy directly from said regulator input voltage during said ON-time and said regulated output voltages receives stored energy from said regulator input voltage after said ON-time terminates.

2. The controller of claim 1, wherein said first and second voltage ramps are generated in response to a common voltage ramp and are substantially equal.

3. The controller of claim 2, wherein said circuitry for processing said ripple reference voltage comprises:
    circuitry for sampling and tracking said ripple reference voltage when said ON-time has terminated; and
    circuitry for holding a value of said ripple reference voltage as said modified reference voltage during said ON-time.

4. The controller of claim 3, wherein said second reference voltage is substantially equal to said first reference voltage.

5. The controller of claim 4 further comprising a ramp circuit for generating said common ramp voltage in response to charging a capacitor with a constant current when said ON-time has terminated and discharging said capacitor during said ON-time.

6. The controller of claim 5, wherein said circuitry for adding said first voltage ramp to said sensed output voltage, comprises:
    a first resistor having a first terminal coupled to said sensed output voltage and a second terminal; and
    a voltage-to-current converter having an input coupled to said control voltage ramp, a first output generating a first current ramp, and a second output generating a second current ramp, wherein said first output is coupled to said second terminal of said first resistor and said modified sensed output voltage is generated at said second terminal in response to said first current ramp flowing in said first resistor.

7. The controller of claim 6, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated at said second terminal of said second resistor in response to said second current ramp flowing in said second resistor.

8. The controller of claim 6, wherein said voltage-to-current converter comprises two transconductance amplifiers having a common input coupled to said control voltage ramp, said first output generating said first current ramp, and second output generating said second current ramp.

9. The controller of claim 6, wherein said voltage-to-current converter is a current mirror circuit.

10. The controller of claim 4 further comprising a ramp circuit for generating said common ramp voltage in response to a load current of said regulated output voltage flowing in a sense resistance.

11. The controller of claim 10, wherein said sense resistance corresponds to a sense resistor in series with said regulated output voltage.

12. The controller of claim 11, wherein said circuitry for adding said first voltage ramp to said sensed output voltage comprises:
    a first resistor having a first terminal coupled to said sensed output voltage and a second terminal; and
    a voltage-to-current converter having an input coupled to said control voltage ramp, a first output generating a first current ramp, and a second output generating a second current ramp, wherein said first output is coupled to said second terminal of said first resistor and said modified sensed output voltage is generated at said second terminal of said first resistor in response to said first current ramp flowing in said first resistor.

13. The controller of claim 12, wherein said voltage-to-current converter comprises two transconductance amplifiers having a common input coupled to said control voltage ramp, said first output generating said first current ramp, and second output generating said second current ramp.

14. The controller of claim 12, wherein said circuitry for adding said second voltage ramp to said first reference voltage comprises a second resistor having a first terminal coupled to said first reference voltage and a second terminal coupled to said second output of said voltage-to-current converter, wherein said ripple reference voltage is generated at said second terminal of said second resistor in response to said second current ramp flowing in said second resistor.

15. The controller of claim 10, wherein said sense resistance corresponds to a switch resistance of a first electronic switch that is gated OFF when said ON-time starts and is gated ON when said ON-time has terminated, wherein said first electronic switch conducts said load current when gated ON.

16. The controller of claim 15, wherein said ramp circuit comprises:
    circuitry for sampling and tracking a voltage across said sense resistance when said ON-time has terminated; and
    circuitry for holding a value of said voltage across said sense resistance as said control ramp voltage during said ON-time.

17. The controller of claim 16, wherein said circuitry for adding said first voltage ramp to said sensed output voltage comprises:
- a first resistor having a first terminal coupled to said sensed output voltage and a second terminal; and
- a voltage-to-current converter having an input coupled to said control voltage ramp, a first output generating a first current ramp, and a second output generating a second current ramp, wherein said first output is coupled to said second terminal and said modified sensed output voltage is generated at said second terminal of said first resistor in response to said first current ramp flowing in said first resistor.

18. The controller of claim 17, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated, at said second terminal of said second resistor in response to said second current ramp flowing in said second resistor.

19. The controller of claim 17, wherein said voltage-to-current converter comprises two transconductance amplifiers having a common input coupled to said control voltage ramp, said first output generating said first current ramp and second output generating said second current ramp.

20. The controller of claim 2, wherein said circuitry for processing said ripple reference voltage comprises a low pass filter circuit having an input coupled to said ripple reference voltage and an output generating said modified reference voltage.

21. The controller of claim 20, wherein said first reference voltage is generated by an offset circuit comprising:
- a differential transconductance amplifier having a positive input coupled to said regulated output voltage, a negative input coupled to said second reference voltage, and generating a reference current output as a gain times a difference between said regulated output voltage and said second reference voltage, wherein said reference current is coupled to a capacitor that integrates said reference current generating said first reference voltage.

22. The controller of claim 21 further comprising a ramp circuit for generating a first control ramp voltage in response to a load current of said regulated output voltage flowing in a sense resistance.

23. The controller of claim 22, wherein said sense resistance corresponds to a switch resistance of a first electronic switch that is gated OFF when said ON-time starts and is gated ON when said ON-time has terminated, wherein said first electronic switch conducts said load current when gated ON.

24. The controller of claim 23, wherein said ramp circuit comprises:
- circuitry for sampling and tracking a voltage across said sense resistance when said ON-time has terminated; and
- circuitry for holding a value of said voltage across said sense resistance as said control ramp voltage during said ON-time.

25. The controller of claim 24, wherein said circuitry for adding said first voltage ramp to said sensed output voltage comprises:
- a first resistor having a first terminal coupled to said sensed output voltage and a second terminal; and
- a first voltage-to-current converter having an input coupled to said first control voltage ramp, a first output generating a first current ramp, and a second output generating a second current ramp, wherein said first output is coupled to said second terminal of said first resistor and said modified sensed output voltage is generated at said second terminal in response to said first current ramp flowing in said first resistor.

26. The controller of claim 25, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated at said second terminal of said second resistor in response to said second current ramp flowing in said second resistor.

27. The controller of claim 25, wherein said voltage-to-current converter comprises two transconductance amplifiers having a common input coupled to said control voltage ramp, said first output generating said first current ramp, and second output generating said second current ramp.

28. The controller of claim 27 further comprising:
- circuitry for adding a third voltage ramp to said sensed output voltage; and
- circuitry for adding a fourth voltage ramp to said first reference voltage.

29. The controller of claim 28 further comprising a second ramp circuit for generating a second control ramp voltage in response to charging a capacitor with a constant current when said ON-time has terminated, wherein said capacitor is discharged during said ON-time.

30. The controller of claim 29, wherein said circuitry for adding said third voltage ramp to said sensed output voltage further comprises a second voltage-to-current converter having an input coupled to said second control voltage ramp, a third output generating a third current ramp, and a fourth output generating a fourth current ramp, wherein said third output is coupled to said second terminal of said first resistor, wherein said modified sensed output voltage is further modified in response to said third current ramp flowing in said first resistor.

31. The controller of claim 30, wherein said circuitry for adding said fourth voltage ramp to said first reference voltage further comprises coupling said fourth output said second terminal of said second resistor, wherein said modified reference voltage is further modified in response to said fourth current ramp flowing in said second resistor.

32. The controller of claim 30, wherein said voltage-to-current converter comprises two transconductance amplifiers having a common input coupled to said control voltage ramp, said first output generating said first current ramp, and second output generating said second current ramp.

33. A system comprising:
- a processor;
- a memory for storing instructions and data for said processor;
- a display interface for coupling signals from said processor to a display device;
- a user interface for coupling signals from a user to said processor; and
- a buck regulator receiving a regulator input voltage and generating a regulated output voltage for said system, an ON-time of said buck regulator controlled by a constant ON-time controller having;
- circuitry for sensing said regulated output voltage and generating a sensed output voltage proportional to said regulated output voltage;

circuitry for adding a first voltage ramp to said sensed output voltage to generate a modified sensed output voltage;

circuitry for adding a second voltage ramp to a first reference voltage to generate a ripple reference voltage;

circuitry for processing said ripple reference voltage to generate a modified reference voltage;

circuitry for comparing said modified sensed output voltage to said modified reference voltage generating a comparator output having a first logic state when said modified sensed output voltage is greater than said modified reference voltage and a second logic state when said modified sensed output voltage is less than said modified reference voltage; and circuitry for generating a control voltage having a first logic state during said ON-time in response to said comparator output, said regulator input voltage and a second reference voltage, wherein said regulated output voltage receives energy directly from said regulator input voltage during said ON-time and said regulated output voltages receives stored energy from said regulator input voltage after said ON-time terminates.

34. The system of claim 33, wherein said first and second voltage ramps are generated in response to a common voltage ramp and are substantially equal.

35. The system of claim 34, wherein said circuitry for processing said ripple reference voltage comprises:

circuitry for sampling and tracking said ripple reference voltage when said ON-time has terminated; and circuitry for holding a value of said ripple reference voltage as said modified reference voltage during said ON-time.

36. The system of claim 35, wherein said second reference voltage is substantially equal to said first reference voltage.

37. The system of claim 36 further comprising a ramp circuit for generating said common ramp voltage in response to charging a capacitor with a constant current when said ON-time has terminated and discharging said capacitor during said ON-time.

38. The system of claim 37, wherein said circuitry for adding said first voltage ramp to said sensed output voltage comprises:

a first resistor having a first terminal coupled to said sensed output voltage and a second terminal; and a voltage-to-current converter having an input coupled to said control voltage ramp, a first output generating a first current ramp, and a second output generating a second current ramp, wherein said first output is coupled to said second terminal of said first resistor and said modified sensed output voltage is generated at said second terminal in response to said first current ramp flowing in said first resistor.

39. The system of claim 38, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated at said second terminal of said second resistor in response to said second current ramp flowing in said second resistor.

40. The system of claim 38, wherein said voltage-to-current converter comprises two transconductance amplifiers having a common input coupled to said control voltage ramp, said first output generating said first current ramp, and second output generating said second current ramp.

41. The system of claim 38, wherein said voltage-to-current converter is a current mirror circuit.

42. The system of claim 36 further comprising a ramp circuit for generating said common ramp voltage in response to a load current of said regulated output voltage flowing in a sense resistance.

43. The system of claim 42, wherein said sense resistance corresponds to a sense resistor in series with said regulated output voltage.

44. The system of claim 43, wherein said circuitry for adding said first voltage ramp to said sensed output voltage comprises:

a first resistor having a first terminal coupled to said sensed output voltage and a second terminal; and a voltage-to-current converter having an input coupled to said control voltage ramp, a first output generating a first current ramp, and a second output generating a second current ramp, wherein said first output is coupled to said second terminal of said first resistor and said modified sensed output voltage is generated at said second terminal of said first resistor in response to said first current ramp flowing in said first resistor.

45. The system of claim 44, wherein said voltage-to-current converter comprises two transconductance amplifiers having a common input coupled to said control voltage ramp, said first output generating said first current ramp, and second output generating said second current ramp.

46. The system of claim 45, wherein said circuitry for adding said second voltage ramp to said first reference voltage comprises a second resistor having a first terminal coupled to said first reference voltage and a second terminal coupled to said second output of said voltage-to-current converter, wherein said ripple reference voltage is generated at said second terminal of said second resistor in response to said second current ramp flowing in said second resistor.

47. The system of claim 42, wherein said sense resistance corresponds to a switch resistance of a first electronic switch that is gated OFF when said ON-time starts and is gated ON when said ON-time has terminated, wherein said first electronic switch conducts said load current when gated ON.

48. The system of claim 47, wherein said ramp circuit comprises:

circuitry for sampling and tracking a voltage across said sense resistance when said ON-time has terminated; and circuitry for holding a value of said voltage across said sense resistance as said control ramp voltage during said ON-time.

49. The system of claim 48, wherein said circuitry for adding said first voltage ramp to said sensed output voltage comprises:

a first resistor having a first terminal coupled to said sensed output voltage and a second terminal; and a voltage-to-current converter having an input coupled to said control voltage ramp, a first output generating a first current ramp, and a second output generating a second current ramp, wherein said first output is coupled to said second terminal and said modified sensed output voltage is generated at said second terminal of said first resistor in response to said first current ramp flowing in said first resistor.

50. The system of claim 49, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated at said second terminal of said second resistor in response to said second current ramp flowing in said second resistor.

51. The system of claim 49, wherein said voltage-to-current converter comprises two transconductance amplifiers having a common input coupled to said control voltage ramp, said first output generating said first current ramp and second output generating said second current ramp.

52. The system of claim 34, wherein said circuitry for processing said ripple reference voltage comprises a low pass filter circuit having an input coupled to said ripple reference voltage and an output generating said modified reference voltage.

53. The system of claim 52, wherein said first reference voltage is generated by an offset circuit comprising:
a differential transconductance amplifier having a positive input coupled to said regulated output voltage, a negative input coupled to said second reference voltage, and generating a reference current output as a gain times a difference between said regulated output voltage and said second reference voltage, wherein said reference current is coupled to a capacitor that integrates said reference current generating said first reference voltage.

54. The system of claim 53 further comprising a ramp circuit for generating a first control ramp voltage in response to a load current of said regulated output voltage flowing in a sense resistance.

55. The system of claim 54, wherein said sense resistance corresponds to a switch resistance of a first electronic switch that is gated OFF when said ON-time starts and is gated ON when said ON-time has terminated, wherein said first electronic switch conducts said load current when gated ON.

56. The system of claim 55, wherein said ramp circuit comprises:
circuitry for sampling and tracking a voltage across said sense resistance when said ON-time has terminated; and
circuitry for holding a value of said voltage across said sense resistance as said control ramp voltage during said ON-time.

57. The system of claim 56, wherein said circuitry for adding said first voltage ramp to said sensed output voltage comprises:
a first resistor having a first terminal coupled to said sensed output voltage and a second terminal; and
a first voltage-to-current converter having an input coupled to said first control voltage ramp, a first output generating a first current ramp, and a second output generating a second current ramp, wherein said first output is coupled to said second terminal of said first resistor and said modified sensed output voltage is generated at said second terminal in response to said first current ramp flowing in said first resistor.

58. The system of claim 57, wherein said circuitry for adding said second voltage ramp to said first reference voltage comprises a second resistor having a first terminal coupled to said first reference voltage and a second terminal coupled to said second output of said voltage to current converter, wherein said ripple reference voltage is generated at said second terminal of said second resistor in response to said second current ramp flowing in said second resistor.

59. The system of claim 57, wherein said voltage-to-current converter comprises two transconductance amplifiers having a common input coupled to said control voltage ramp, said first output generating said first current ramp, and second output generating said second current ramp.

60. The system of claim 59 further comprising:
circuitry for adding a third voltage ramp to said sensed output voltage; and
circuitry for adding a fourth voltage ramp to said first reference voltage.

61. The system of claim 60 further comprising a second ramp circuit for generating a second control ramp voltage in response to charging a capacitor with a constant current when said ON-time has terminated, wherein said capacitor is discharged during said ON-time.

62. The system of claim 61, wherein said circuitry for adding said third voltage ramp to said sensed output voltage further comprises a second voltage-to-current converter having an input coupled to said second control voltage ramp, a third output generating a third current ramp, and a fourth output generating a fourth current ramp, wherein said third output is coupled to said second terminal of said first resistor, wherein said modified sensed output voltage is further modified in response to said third current ramp flowing in said first resistor.

63. The system of claim 62, wherein said circuitry for adding said fourth voltage ramp to said first reference voltage further comprises coupling said fourth output said second terminal of said second resistor, wherein said modified reference voltage is further modified in response to said fourth current ramp flowing in said second resistor.

64. The system of claim 62, wherein said voltage-to-current converter comprises two transconductance amplifiers having a common input coupled to said control voltage ramp, said first output generating said first current ramp, and second output generating said second current ramp.

* * * * *